United States Patent
Linkiewicz

(12) 
(10) Patent No.: US 6,250,048 B1
(45) Date of Patent: Jun. 26, 2001

(54) LONGITUDINAL SEAM SEALER FOR POLYETHYLENE MATERIAL

(75) Inventor: John M. Linkiewicz, Prospect Heights, IL (US)

(73) Assignee: Triangle Package Machinery Company, Chicago, IL (US)

( * ) Notice: Subject to any disclaimer, the term of this patent is extended or adjusted under 35 U.S.C. 154(b) by 0 days.

(21) Appl. No.: 09/532,641

(22) Filed: Mar. 21, 2000

Related U.S. Application Data

(62) Division of application No. 09/188,015, filed on Nov. 6, 1998, now Pat. No. 6,038,839.

(51) Int. Cl.$^7$ .................................................. B65B 9/06
(52) U.S. Cl. ........................ 53/451; 53/479; 156/497
(58) Field of Search ........................ 53/451, 479; 156/497

(56) References Cited

U.S. PATENT DOCUMENTS

| | | | |
|---|---|---|---|
| 2,405,675 | 8/1946 | Southwick, Jr. et al. | |
| 3,580,788 * | 5/1971 | Gustafson | 156/499 |
| 3,795,083 | 3/1974 | Wells | 53/138 |
| 3,825,408 | 7/1974 | Farfaglia et al. | |
| 3,884,746 | 5/1975 | Loliger et al. | 156/466 |
| 3,953,272 * | 4/1976 | Webber | 156/499 |
| 3,992,854 * | 11/1976 | Howell et al. | 53/551 |
| 4,067,761 | 1/1978 | Shirley | 156/218 |
| 4,085,778 | 4/1978 | Wright | 140/93 |
| 4,103,473 * | 8/1978 | Bast et al. | 53/551 |
| 4,211,051 | 7/1980 | Tucker | 53/138 |
| 4,223,508 | 9/1980 | Wells | 53/138 R |
| 4,750,313 | 6/1988 | Kammler et al. | 53/451 |
| 4,751,808 | 6/1988 | Hadden | 53/541 |
| 4,939,885 | 7/1990 | Steinke | 53/138 A |
| 4,947,618 | 8/1990 | Schneider et al. | 53/373 |
| 4,996,852 | 3/1991 | Bacon et al. | 53/451 |
| 5,001,891 | 3/1991 | Abate | 53/551 |
| 5,191,750 | 3/1993 | Kammler | 53/551 |
| 5,203,145 | 4/1993 | Kammler et al. | 53/552 |
| 5,241,800 | 9/1993 | Steinke et al. | 53/55 |
| 5,279,098 | 1/1994 | Fukuda | 53/451 |
| 5,347,795 | 9/1994 | Fukuda | 53/552 |
| 5,412,927 | 5/1995 | Miyazaki et al. | 53/552 |
| 5,440,860 | 8/1995 | Meli et al. | 53/451 |
| 5,463,850 | 11/1995 | Fukuda | 53/551 |
| 5,685,131 | 11/1997 | Spatolisano et al. | 53/550 |
| 5,746,043 | 5/1998 | Terminella et al. | 53/451 |
| 5,816,019 | 10/1998 | Saget et al. | 53/373.9 |
| 5,848,517 | 12/1998 | Yamamoto et al. | 53/551 |
| 5,852,920 | 12/1998 | Linkiewicz | 53/551 |
| 5,935,357 * | 8/1999 | Hubbard et al. | 156/497 |

* cited by examiner

*Primary Examiner*—John Sipos
(74) *Attorney, Agent, or Firm*—F. David AuBuchon; Brinks Hofer Gilson & Lione

(57) ABSTRACT

A form-fill-seal machine in which a heated longitudinal seam sealer continuously forms a longitudinal lap seam along lapped edges of the tube being formed. This longitudinal lap seam sealer can be used in machines having conventional cross sealing jaws as well as in machines in which the cross sealing jaws move in the direction of the moving film during the cross sealing operation. The heated longitudinal seam sealer includes a wafer thin internal hot air dispenser that discharges hot air from both surfaces on the surfaces to be fused together. The heated longitudinal seam sealer also includes an external hot air dispenser that includes a plurality of hot air discharge jets through which hot air is discharges on the outer surface of one of the overlapped edges that not only provides necessary heat to cause fusion but also exerts sufficient pressure on the overlapped edge to insure proper sealing.

4 Claims, 18 Drawing Sheets

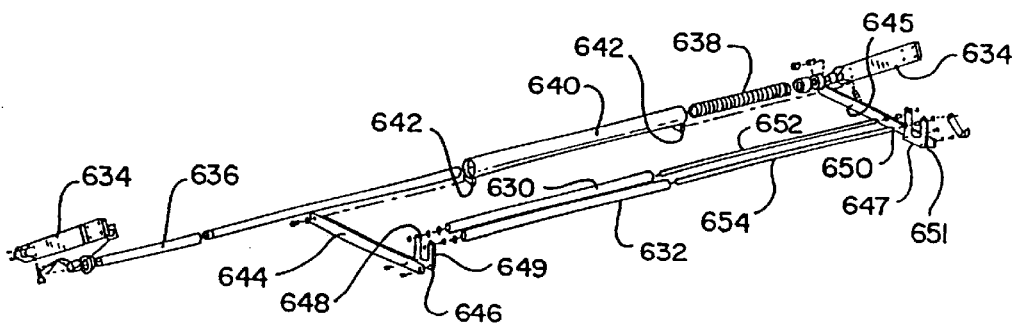
FIG. 23
FIG. 24
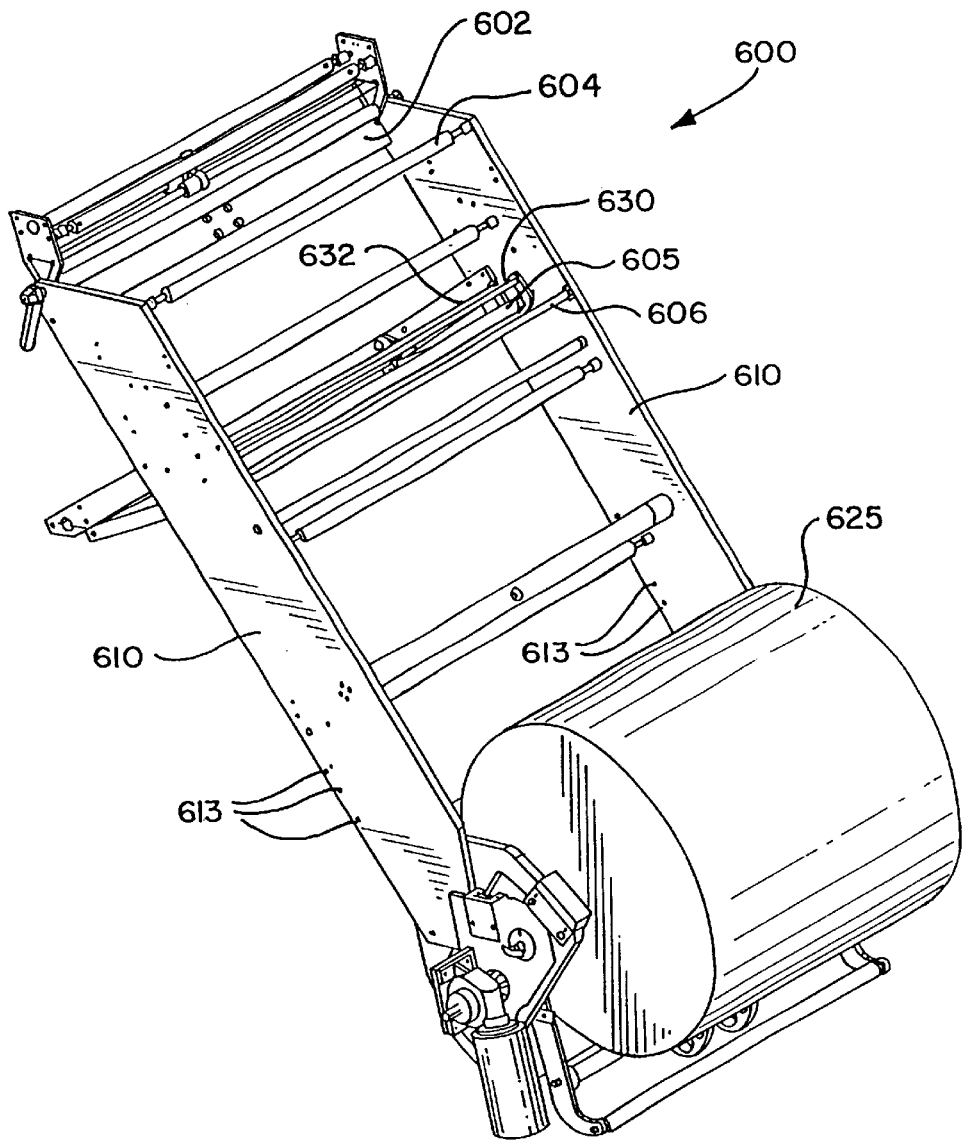

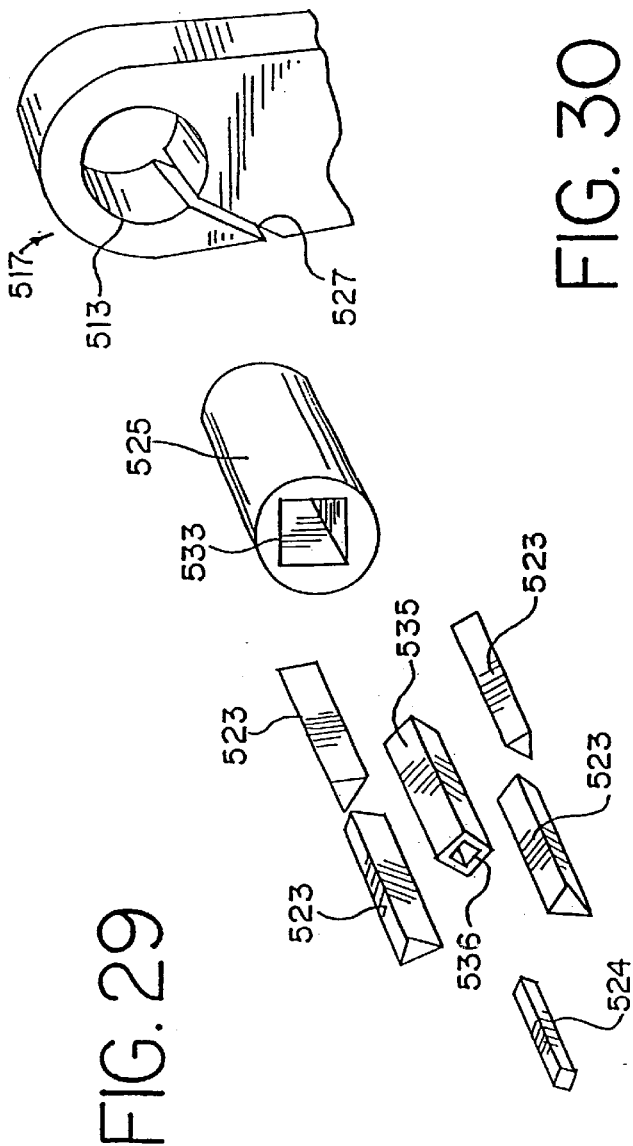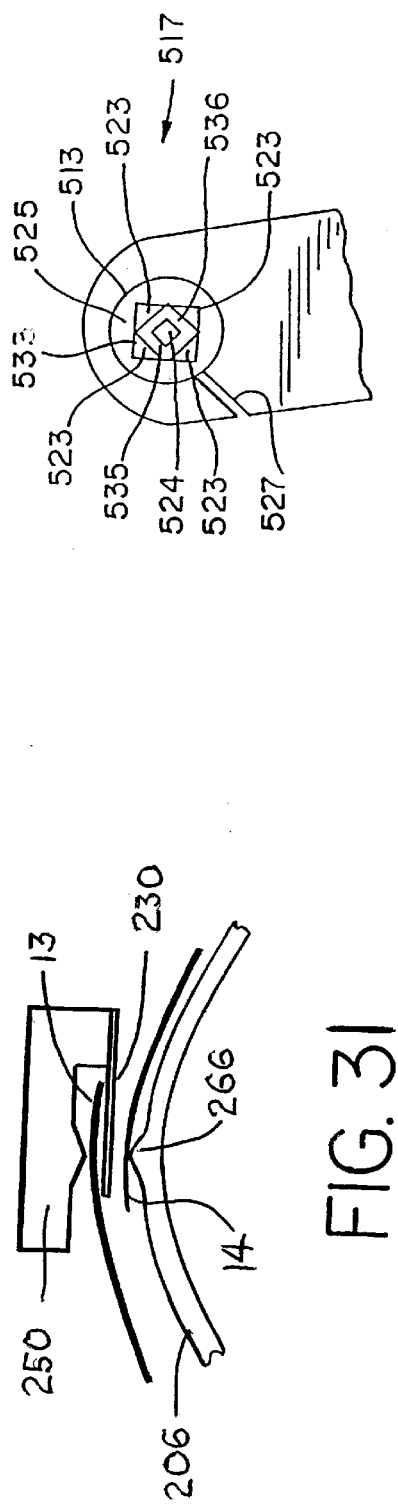
FIG. 29 FIG. 30 FIG. 31

LONGITUDINAL SEAM SEALER FOR POLYETHYLENE MATERIAL

This application is a division of application Ser. No. 09/188,015, filed Nov. 6, 1998, now U.S. Pat. No. 6,038,839.

BACKGROUND OF THE INVENTION

This invention relates to a packaging apparatus and a method of forming packages. More specifically, this invention relates to a form fill seal machine in which the longitudinal seam is continuously formed. The cross sealing jaws can be of the type that move downwardly during the sealing operation and are synchronized with the film and the package being formed or of the type that do not move along the direction of the film feed.

The cross seal mechanism that seals the top and bottom of each package produced on a form-fill-seal packaging systems is a critical component of such a system insofar as controlling the quality of the package. The cross seal mechanism must operate at a precise time in the package cycle and must complete its operation with precision and speed.

Reference is hereby made to U.S. Pat. No. 5,715,656 ('656 patent) for a more complete disclosure of the form-fill-seal machine disclosed herein. The subject matter of the '656 patent is hereby incorporated by reference as a part of this application.

The cross seal mechanism disclosed in the above identified '656 patent moves horizontally but does not move vertically. Thus, in that machine, vertical movement of the tubular container must cease during the cross sealing operation and then resume after the cross sealing operation has been completed.

Current cross seal mechanisms are complex and require constant monitoring and adjustment to assure the quality of the finished product. The intermittent or discontinuous movement of the film and the tubular package formed therefrom introduces problems in maintaining control over the film and complicates the film feeding mechanism and its controls. For these and other reasons, there is a need for cross sealing mechanisms that perform the sealing and severing operations while moving vertically in time with the vertical movement of the package being formed.

A form-fill-seal machine in which the cross sealing jaws move downwardly during the sealing operation is disclosed in U.S. Pat. No. 5,752,370 ('370 patent). In this patent, the cross sealing jaws move in the direction of the moving film during the cross sealing operation. The drive for the cross sealing jaws includes a pair of gear cases on opposite sides of the sealing jaws each having two sets of spaced drive shafts. The drive shafts include cranks that impart rotary motion to a pair of link bases for the front and rear sealing jaws. Pairs of parallel links are pivotally connected at one end to the link bases and at the other end to the sealing jaws. The pivot connections of the parallel links include pressure or torsion members which bias the sealing jaws toward engagement. The subject matter of the '370 patent is hereby incorporated by reference as a part of this application.

A form-fill-seal machine is disclosed in U.S. Patent application Ser. No. 08/984,812 in which a heated longitudinal seam sealer continuously forms a longitudinal fin seam along the marginal edges of the film. The fin seam is formed by folding the marginal edges of the film outwardly, such that the inner surfaces of both marginal edges engage. Both engaged surfaces are on the same surface of the film. Heat and pressure are simultaneously applied to the outer surfaces of the marginal edges. The outer film surfaces are non-sticky and are generally very tough. Supported films with the sealant run very well on this fin sealer. However, the resulting seam protrudes away from the outer surface of the finished package. Packages that are produced from non-fusible material, for example paper, can be produced using this backseal When this backsealer is used, one surface of the non-fusible material is coated or laminated with an adhesive or fusible layer that will fuse when heat is applied. This type of seam is most often used for packages, for example breakfast cereal bags, that will be packaged in a carton. This longitudinal seam sealer can be used in machines having conventional cross sealing jaws as well as in machines in which the cross sealing jaws move in the direction of the moving film during the cross sealing operation. The heated longitudinal seam sealer includes a pair of sealer bars that include shaped confronting portions that are heated. The shaped confronting portions function to seal the marginal edges to thus form a fin seam. After exiting the shaped confronting portions, the seam is engaged by a pair of pressure rollers that force the heated marginal edges together to insure complete closure of the fin seam.

Fin type seals are not preferred in plastic bags commonly referred to as pillow bags. The outer surfaces of most pillow bags include printed material describing the contents of the bag and its source. A fin seam protruding from the surface of a pillow bag is folded over. The preferred longitudinal seam for pillow bags, for example a bag of vegetables, is a lap seam. A lap seam is formed by overlapping one marginal edge with a second marginal edge of the film. When this is done on a form-fill-seal machine the engaging surfaces are from opposite surfaces of the film. Thus, to form a lap seam with non fusible material it would be necessary to coat or laminate both surfaces of the film with an adhesive material, which would add unnecessary cost to the product. However, if the film is fusible, for example if the film is a polyethylene material, the opposite surfaces of the film can be fused. However, if the web material is a light polyethylene material then pressure cannot be applied when heating the film. When light polyethylene film is heated to a sufficient temperature to seal the film, the film has nearly zero structural strength. As a result when producing a longitudinal lap seam the seaming mechanism must be essentially friction free so to not produce a drag on the film. Yet to assure a seal having adequate strength the application of some pressure is important. In the preferred embodiment, sufficient pressure is provided by the stream of hot air from the external hot air dispenser. However, in some situations, a very light roller pressure could be utilized.

Thus a longitudinal backsealer, for use with a form-fill-seal machine, is needed that will produce a continuous lap seam that posses adequate strength.

SUMMARY OF THE INVENTION

In accordance with an embodiment of this invention a form-fill-seal packaging machine that forms fusible flexible packaging material into a tubular shape includes a mechanism for producing a longitudinal lap seam along overlapped marginal edges of the fusible material. The fusible material can be a polyethylene material. Polyethylene is a thermoplastic and thus softens when heated and hardens when cooled. Thus when the proper amount of heat is applied to overlapped edges of polyethylene material the overlapped edges will fuse together.

According to an embodiment of this invention the fusible material is fed continuously and the mechanism for producing a longitudinal lap seam does not produce a drag that adversely effects its continuous feed or places unacceptable stresses on the material being fused.

According to an embodiment of this invention tubular shaped material is continuously fed downward and the longitudinal edges of the flexible packaging material are continuously sealed as the material moves downwardly to form a longitudinal seam. The tubular shaped package is sealed at package length intervals, by cross sealing jaws that move downwardly in a continuous motion during the sealing operation. The cross sealing jaws also cuts the tube into individual packages. In the embodiment of the invention disclosed herein vacuum belts, that are fixed relative to the forming tube, are used to pull the film downward along the forming tube.

There is a need for a form-fill-seal machine in which the continuous feed cross seal mechanism has a simple design, for which the speed and timing can be precisely controlled and easily changed to accommodate conditions and which provides reliable performance and the longitudinal sealing mechanism can accommodate changes in the vertical movement while producing a high quality seal.

The present invention provides a new, continuous feed cross sealing mechanism for a form-fill-seal machine that includes a new and unique, durable, rotary drive mechanism that has no moving jaw in respect to the mounting member, reciprocating parts or coil springs that function in cooperation with a longitudinal sealing mechanism that produces a reliable lap seam as the film continuously advances.

This invention comprises a continuous feed cross feed mechanism in which the cross sealing jaws can be in engagement for up to 70% of the cycle and the drive mechanism will permit the rotary speed of the drive mechanism to be varied during the sealing portion of the cycle and provide maximum jaw closure time during which the longitudinal sealing mechanism is producing a continuous lap seam.

The invention can be retrofitted to existing machines or supplied as original equipment with new form-fill-seal machines.

The invention further comprises gear cases located on both sides of the continuous moving sealing jaws that are driven by a microprocessor controlled servo motor and a longitudinal sealing mechanism that is continuously producing a lap seam along the longitudinal edges of the film.

The invention further comprises a longitudinal seam sealer that produces a lap seam but does not exert a pressure on the film material being fused. The longitudinal seam sealer heats the film to a temperature that causes it to fuse yet does not exert pressure on the film sufficient to adversely affect the film being fused or place a drag on the material while the material is being advanced.

The invention further includes a longitudinal seam sealer that includes an internal hot air dispenser that directs hot air on both surfaces to be fused without placing a drag on the material and an external hot air dispenser that directs hot air on the opposite surface of one of the layers in the direction of the other layer of material which exerts a minimal force on the longitudinal seam. Although the internal hot air dispenser is an important component of this invention, in some materials and under some conditions, it is possible to eliminate the internal hot air dispenser and use only the external hot air dispenser.

Still further, the invention includes a longitudinal seam sealer that can be used with horizontal or vertical form fill and seal machines and with machines that have continuous movement cross sealing jaws or cross sealing jaws that do not advance in the direction of film feed.

While a number of control systems can be used in accordance with the present invention, the preferred control consists of a microprocessor control system that utilizes the Versa Module Europe (VME) standard card cage system. The VME system can use GS DOS, which is an industrial version of DOS, Windows and/or a number of standard software packages and components such as touch screens, modems and other hardware devices. This microprocessor control system provides the advantage of logically grouping by function the input/output screens that prompt the operator through start-ups, changes and adjustments. The operating system also enables the use of real-time statistics and diagnostics which permits the operator to perform weighing and cycle analyses.

When producing a lap seam from fusible material, the surfaces to be fused must be heated to a temperature at which the material melts. This diminishes the strength of the material while it is at the elevated temperature such that it cannot tolerate the application of excess pressure. However, some pressure is necessary to insure a reliable seal. To resolve these conflicting requirements, forced hot air is used in the heating zone to maintain the necessary fusion temperature and apply tolerable but sufficient pressure. A perforated wafer thin internal heater is used to apply heat between the film layers and a nozzle with multiple forced air jets is provided to direct hot air against the outer film layer to cause a seal pressure to occur between layers to produce structural bonding.

BRIEF DESCRIPTION OF THE DRAWINGS

The drawings illustrate an embodiment of the invention in which:

FIG. 23 is an exploded perspective view of the dancer bar assembly.

FIG. 24 is an isolated perspective view of the film cage assembly.

FIG. 29 is an exploded view of one of the pressure devices.

FIG. 30 is a side view of the upper end of a link having a pressure device mounted therein.

FIG. 31 is a schematic cross section view of this mechanism for forming a lap seam.

DETAILED DESCRIPTION OF THE PREFERRED EMBODIMENT

Figure 1:
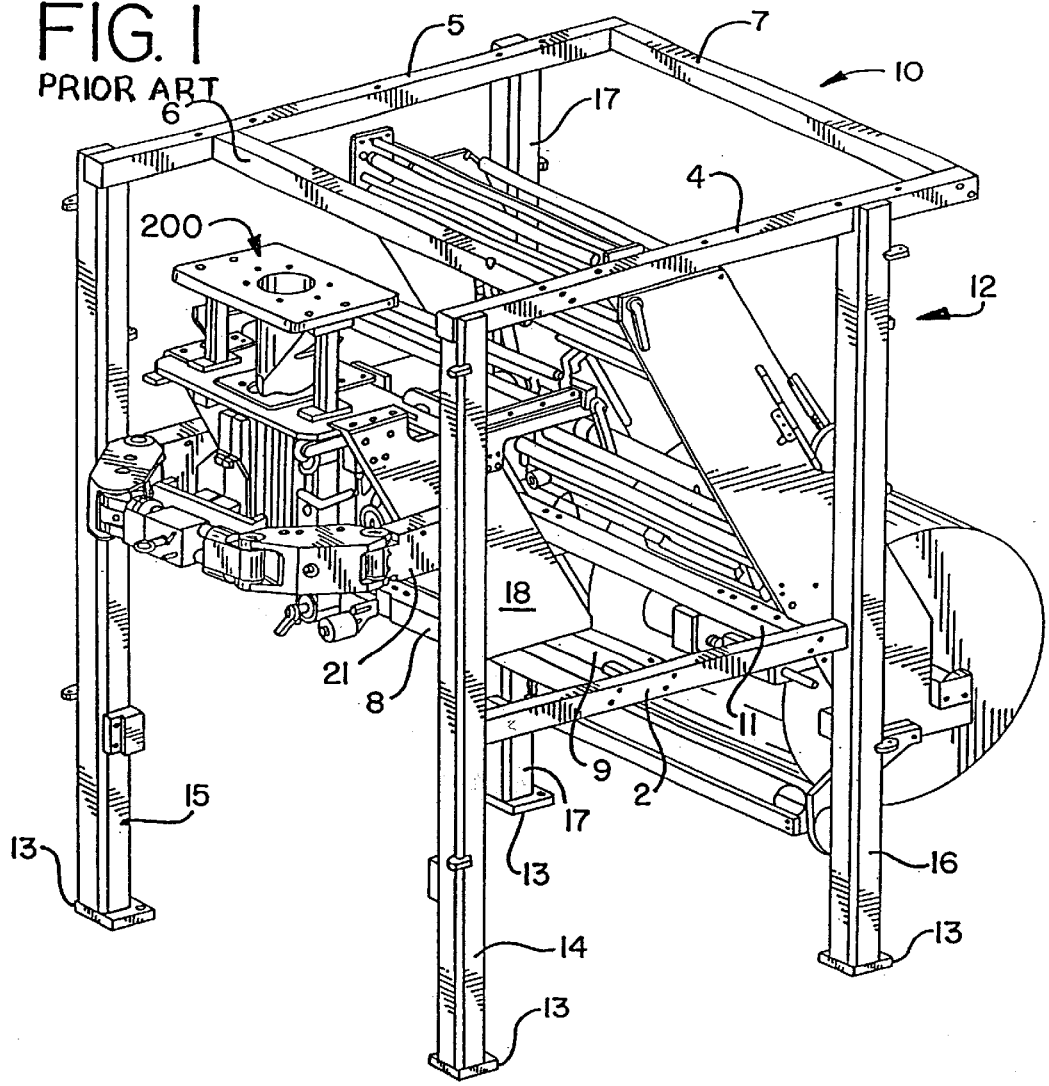
FIG. 1 is a perspective view of a prior art form-fill-seal machine as seen from the front upper right.

FIG. 1, which has been labeled PRIOR ART, is a perspective view of the form-fill-seal machine 10 as seen from the front upper right. The sealing jaw mechanism 100, which is illustrated in greater detail in FIGS. 12 through 20, is mounted on the machine as seen in FIG. 1.

The form-fill-seal machine 10 is built around a frame 12 that includes base plates 13 that rest upon the floor and support vertical columns 14–17. Vertical columns 14 and 16 are connected by a lower support member 2 and an upper support member 4. Vertical columns 15 and 17 are connected by a lower support member 3 and an upper support member 5. Support members 2–5 extend in the fore and aft direction of the form-fill-seal machine 10. The fore and aft extending upper support members 4 and 5 are connected by a forward support member 6 and a rearward support member 7. The fore and aft extending lower support members 2 and 3 are connected by a forward support member 8, a mid-support member 9 and a rear support member 11. Right and left parallelogram-shaped plates, 18 and 19 (shown in FIGS. 8 and 9), respectively, are secured to and extend upward and forward from the forward support member 8 and the mid-support member 9.

Figure 2:
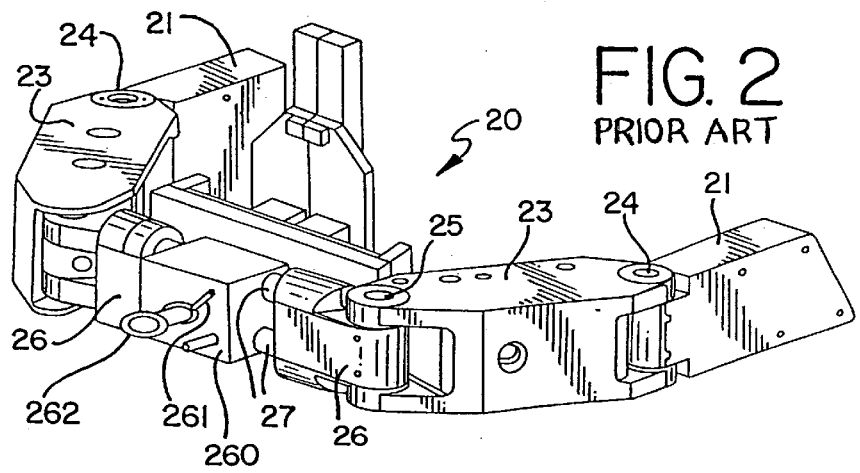
FIG. 2 is an isolated perspective view of a prior art longitudinal seam sealer and its mounting mechanism as seen from the front upper right.

As further shown in FIG. 2, also labeled as PRIOR ART, a longitudinal seam sealer 20 is supported by mounting members 21 that are secured to the outer surfaces of plates 18 and 19 by nuts and bolts. The mounting members 21 include vertical bores at their free ends through which link members 23 are pivotally connected about vertical pivots 24. The other ends of link members 23 are pivotally connected about vertical pivots 25 to mounting members 26. There are spring biased ball detents that hold the link members 23 and mounting members 26 in the relative positions shown in FIG. 1. The link members 23 are controlled by hydraulic cylinders which enable the lateral position of the longitudinal seam sealer 20 to be adjusted. The ball detents can be released upon the application of pressure to move mounting members 26 relative to the link members 23. The other ends of mounting members 26 each have a pair of vertically spaced rods 27 extending therefrom. The pairs of vertically spaced rods 27 extend into opposite sides of the central block and can be reliably locked thereto. The longitudinal seam sealer 20 is carried by the central block 260 that is supported by rods 27 on mounting members 26. A screw mechanism 262 extends from the front of central block 260 that when screwed in and out adjust the in and out location of the longitudinal seam sealer 20. There is a rotating lock mechanism 261 at the base of screw mechanism 262 that can be rotated to secure the screw mechanism 262 in a selected position.

Figure 13:
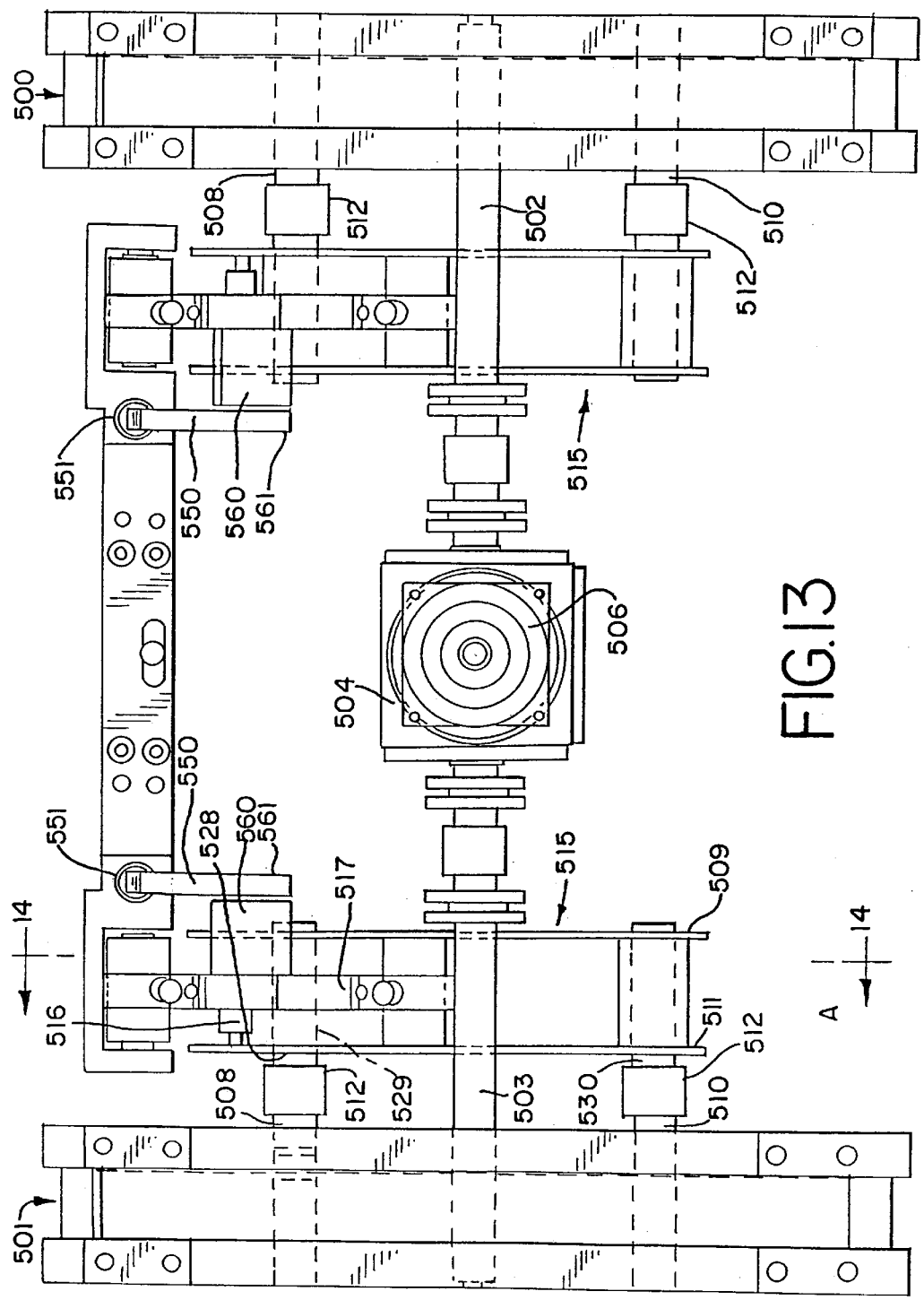
FIG. 13 is a back view of the isolated sealing jaw mechanism.

When the film is wrapped around the forming tube 206 with the marginal edges 13 and 14 overlapped, and it is desired to locate the longitudinal seam sealer 20 such that the internal hot air dispenser 230 is properly located between the overlapped edges, and the external hot air dispenser 250 is properly located with respect to the outer surface of overlapped edge 13, as is shown in FIG. 31, the following steps are followed. The hydraulic cylinders that control the link members 23 are actuated to move the longitudinal seam sealer 20 to the right, as seen in FIG. 13, then the screw mechanism 262 is rotated to move the longitudinal seam sealer 20 toward the forming tube 206 such that the internal hot air dispenser 230 is alongside the overlapped edges 13 and 14. The hydraulic cylinders that control the link members 23 are actuated to move the longitudinal seam sealer 20 to the left into the position shown in FIG. 31. Another embodiment that is contemplated for accomplishing locating the longitudinal seam sealer 20, as shown in FIG. 31, involves pivotally mounting the internal hot air dispenser on the external hot air dispenser 250. To properly locate the longitudinal seam sealer 20 with this embodiment, the screw mechanism 262 is rotated to move the longitudinal seam sealer 20 to its proper fore and aft position relative to the forming tube 206, and then the mechanism for causing the internal hot air dispenser to pivot is activated causing the internal hot air dispenser to pivot into position between the overlapped edges 13 and 14. When the form-fill-seal machine is placed in the standby mode, this sequence of operations should be reversed to avoid exposing the overlapped edges 13 and 14 to the heat that is present in the longitudinal seam sealer 20.

When the form-fill-seal machine is placed in the standby mode or, if this longitudinal seam sealer is used on an intermittent motion machine, then the air supplied to the longitudinal seam sealer 20 should be turned off.

If it is desired to replace the change parts assembly for one that will produce a different size package, the left mounting member 26 is released from the center block 260 which permits right link member 23 to be free to pivot about vertical pivots 24 and 25. This allows the entire longitudinal seam sealer 20 and its mounting mechanism to be pivoted out of their operative positions to an inoperative position outwardly of the right parallelogram shaped plate 18.

Figures 3, 3A:
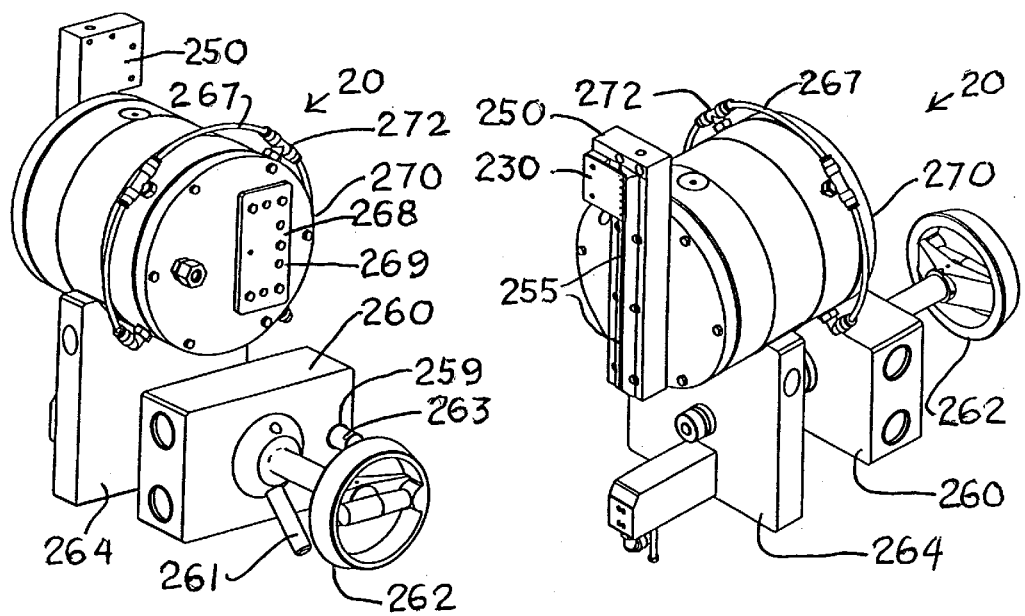
FIG. 3 is an isolated perspective view of the longitudinal seam sealer of this invention and its mounting mechanism as seen from the front upper left.
FIG. 3A is an isolated perspective view of the longitudinal seam sealer of this invention and its mounting mechanism as seen from the back upper left.

Referring now to FIGS. 3, 3A, 6 and 31–44, the preferred embodiment of the longitudinal seam sealer 20 will be discussed. FIG. 3 is an isolated perspective view of the longitudinal seam sealer 20 mounted on the center block 260 as they would be seen looking from the front left of the machine. It should be noted that the center block 260 screw mechanism 262, rotating lock mechanism 261, mounting plate 264, as well as the restraining bar 263 seen in FIG. 3, were discussed above with reference to FIGS. 1 and 2 and are conventional and not a part of this invention. The restraining bar 263 is secured to mounting plate 264 and slides through a bore 259 formed in center block 260. As the longitudinal seam sealer 20 is adjusted fore and aft by the screw mechanism 262, its attitude is maintained by the restraining bar 263. The air heater 270, that is secured to mounting bar 264, and the upper portion of exterior hot air dispenser 250 are seen in FIG. 3.

FIG. 3A is also an isolated perspective view of the longitudinal seam sealer 20 and its mounting mechanism including the center block 260. However, in FIG. 3A, the view is looking from the back left of the form-fill-seal machine toward the front. As a result of looking from the back to the front, the components seen on the left in FIG. 3A are on the right in FIG. 3. The screw mechanism 262 can be seen in this view. The external hot air dispenser 250 is seen mounted on the back of the hot air heater 270 and the internal hot air dispenser 230 is shown mounted on the external hot air dispenser 250.

Figure 6:
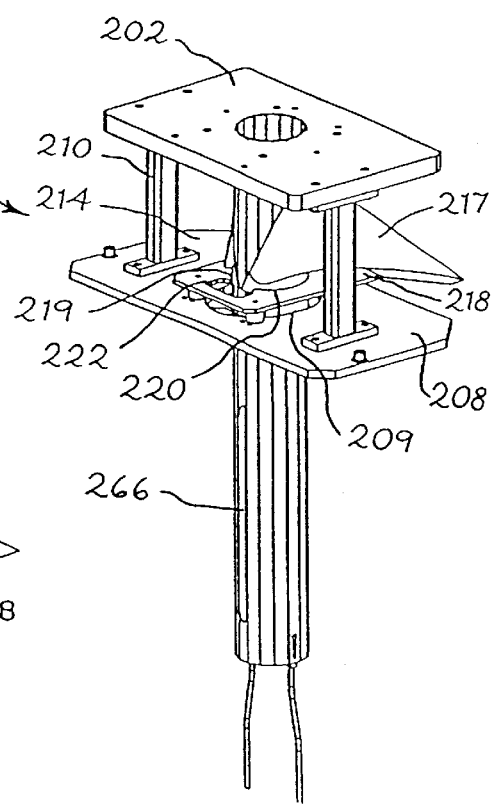
FIG. 6 is a perspective view of a change part mechanism that has been modified for use with this invention.

FIG. 6 is a perspective view of a change part assembly 200. A longitudinal rubber bar 266 is secured to the outer surface of forming tube 206. The internal hot air dispenser 230 will be located just above the top end of bar 266 and the external hot air dispenser 250 will extend downward from the internal hot air dispenser 230 along the rubber bar 266.

It should be noted that, although the bar 266 is disclosed so as to be formed from a resilient material such as rubber, it could also be formed from non-resilient material.

FIG. 31 is a schematic cross section top view through the forming tube 206 in which dimensions have been distorted to better illustrate the relative positions of the elements shown. The longitudinal rubber bar 266 that is secured to the forming tube along the longitudinal seam line is seen in this view. The internal hot air dispenser 230, that discharges hot air from both surfaces extends between the overlapped edges 13 and 14 of the film that is being formed into a tube. The external hot air dispenser 250, that discharges hot air in one direction toward the forming tube 206, is also shown. The hot air from the air that is discharged from the internal hot air dispenser 230 is directed along the seal line toward both surfaces of the overlapped edges 13 and 14 that are to be sealed together. As best seen in FIG. 3A, the internal hot air dispenser extends longitudinally for only a short distance. Thus, the internal hot air dispenser is located between the surfaces that are to be fused together and heats up both of these surfaces. The film then moves downwardly and the external hot air dispenser discharges hot air over the other surface of overlapped edge 13. The hot air from the exterior hot air dispenser is directed toward the forming tube 206 and, thus, exerts a pressure on edge 13 toward edge 14. The longitudinal rubber bar 266 is aligned with the hot air exits 255 of the exterior hot air dispenser and functions as a backup member for the overlapped edges 13 and 14.

Although the hot air exits 244 and 255 in the internal and external hot air dispensers, respectfully, are disclosed herein as being round, it should be understood that they could be shaped as slots as well.

Figure 32:
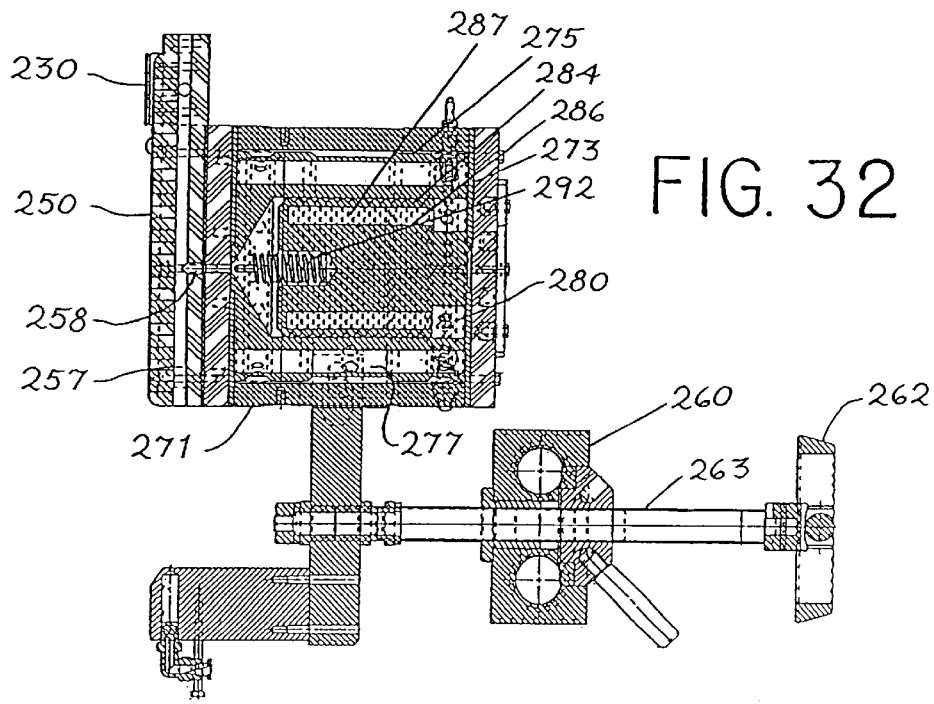
FIG. 32 is a cross-sectional side view of the longitudinal sealer of this invention and its mounting mechanism.

A cross section view of the drum-shaped, electric hot air producing element 270, with the external and internal hot air dispensers 250 and 230, respectfully mounted thereon, is shown in FIG. 32. In the FIGS. 3 and 31, four inlet fixtures 272 are shown connected by tubes 267. This is the cold air inlet into the drum-shaped, electric hot air producing element 270. Also in FIGS. 3 and 31, there is a rectangular plate 268 on the front end of the drum-shaped, electric hot air producing element 270 that has four holes 269 formed therein. These holes are for the four wires (two for each cartridge heater 100). It is important that there be good seals around these wires and better seals are obtained by the individual round wires going through round holes than attempting to seal four wires in an irregular shaped bundle. There is also shown in the perspective view, FIGS. 3 and 31, an inlet fixture 290 which is for a thermocouple wire. The external hot air dispenser 250 and the internal hot air dispenser 230 are visible in FIG. 32.

Figure 33:
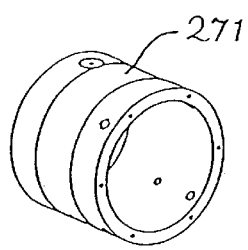
FIG. 33 is a perspective view of the drum shaped air heater body.

The path of the air, as it flows through the electric hot air producing element 270, will be discussed with reference to cross section view, FIG. 32, and the individual views of components shown in FIGS. 40 through 44. As is best seen in FIG. 3, cold air enters the drum-shaped, electric hot air producing element 270 through four air inlet fixtures 272 that are located at its front end. The term "front end," as used in this discussion, being the surfaces seen by a viewer located in front of the form-fill-seal machine and the term "back" meaning the surfaces that would not be visible to a viewer located in front of the form-fill-seal machine. The front end of the drum-shaped body 271, seen in FIG. 33, is closed by an front gusket 273. The back end of the drum-shaped body 271 is closed by a back gusket 274.

Figure 34:
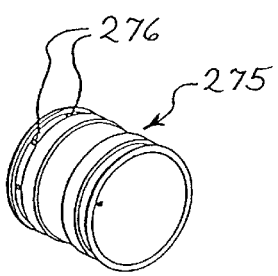
FIG. 34 is a perspective view of the outside heater insert member.
Figure 35:
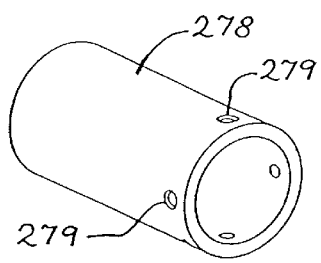
FIG. 35 is a perspective view of the inside heater insert member.
Figure 36:
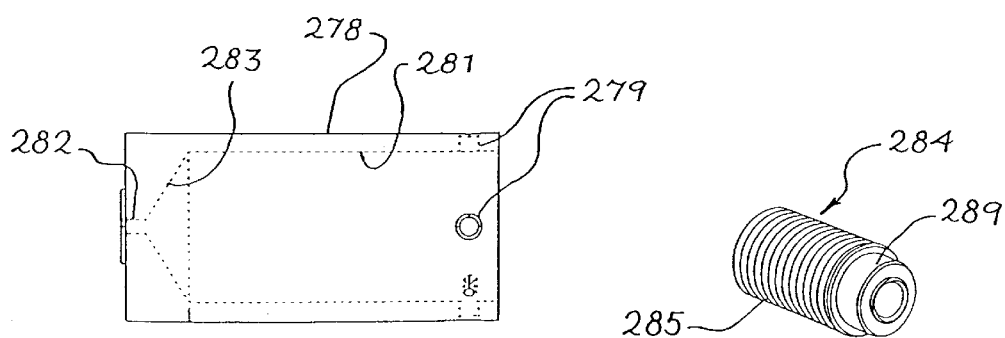
FIG. 36 is a side view of the inside heater insert member.
Figure 37:
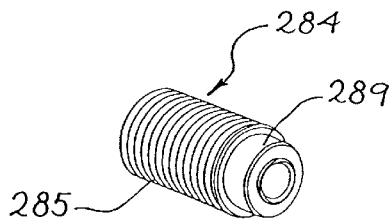
FIG. 37 is a perspective view of the brass insert for the heater mechanism.
Figures 38, 40, 41:
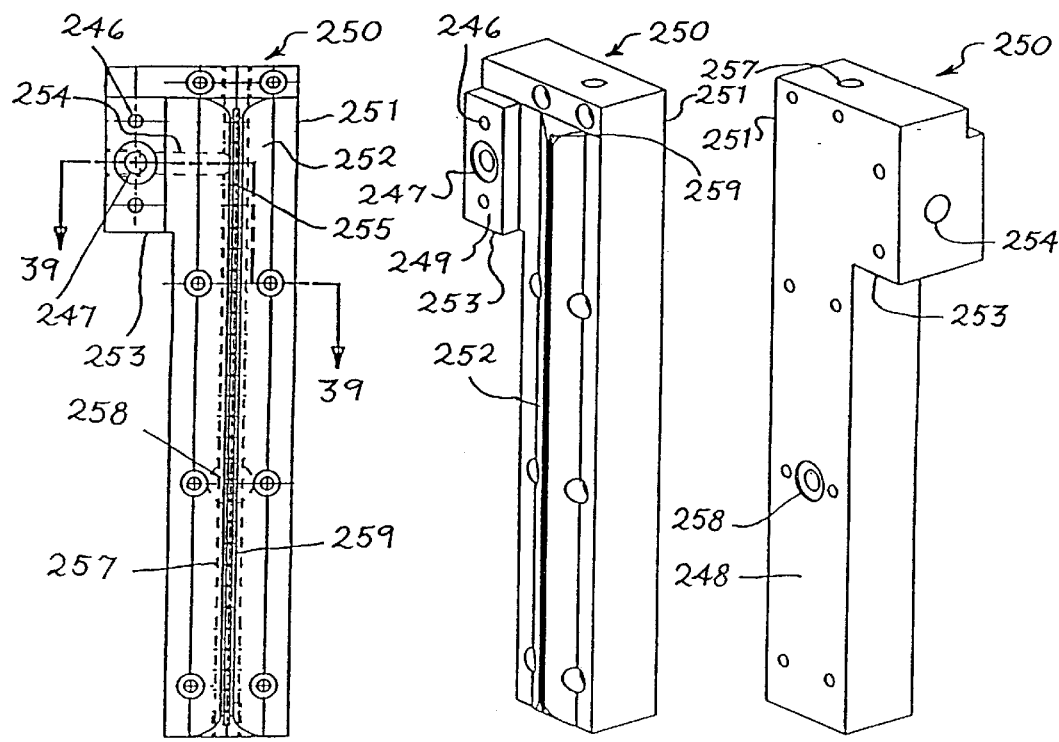
FIG. 38 is a back view of the external hot air dispenser.
FIG. 40 is a perspective view of the external hot air dispenser as seen looking toward the front of the machine from the upper left side of the machine.
FIG. 41 is a perspective view of the external hot air dispenser as seen looking toward the back of the machine from the upper right side of the machine.
Figures 39, 42, 43, 44:
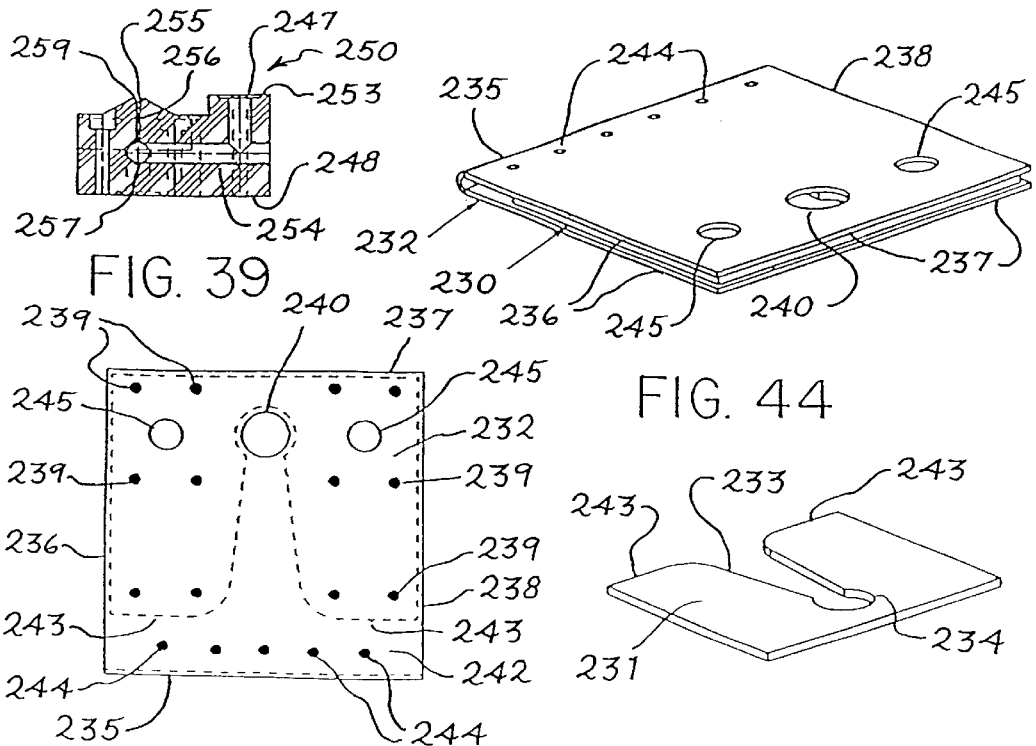
FIG. 39 is a cross-sectional view of the external hot air dispenser taken along lines 39—39 of FIG. 38.
FIG. 42 is a perspective view of the piece of sheet metal that is on the inside of the internal hot air dispenser.
FIG. 43 is a top view of the internal hot air dispenser.
FIG. 44 is a perspective view of the internal hot air dispenser.

An outside heater insert member 275, see FIG. 34, is spaced a small distance from the inside surface of the drum shaped body 271. The unheated air flows through the inlet fixtures 272 and then inwardly through the space between the inner surface of the drum shaped body 271 and the outer surface on the outside heater insert member 275. As will be discussed further, the electric hot air producing element 270 includes electric heaters and, thus, heating of the air begins at this point. As best seen in FIG. 34, there are a plurality of apertures 276 along the back edge of the outside heater insert member 275. The air flows through apertures 276 into a relatively thick cylindrical shaped cavity 277 formed by the inner surface of outside heater insert member 275 and the outer surface of the inside heater insert member 278. The inside heater insert member 278 is shown in FIGS. 39 and 43. As best seen in FIG. 36, a plurality of apertures 279 are provided in the front end of inside heater insert member 278. As best seen in FIG. 36, the inside heater insert member 278 has a relatively large diameter bore 281 extending from its front end and terminating in a cone shape bottom 283 near the back end. A relatively small diameter bore 282 extends from the center of the cone-shaped bottom 283 through the back end of the inside heater insert member 278. The air flows outwardly through cavity 277 and then through the apertures 279 into an annular shaped cavity 280.

A brass insert 284, having large screw threads 285 formed along its outer cylindrical surface, is located in the large diameter bore 281. The brass insert 284 has two bores 286 formed therein that receive electrically powered cartridge heaters 287. The cartridge heaters 287 are controlled by a thermocouple the wire for which is received through inlet fixture 290. The thermocouple function to control and regulate the heat that is provided to brass insert 284. At the front end of brass insert 284, there is a reduced diameter portion 289 that forms the annular cavity 280 into which the air flowing through apertures 279 enters. From the annular cavity 280, the air flows into the screw threads 285 formed on the outer surface of the brass insert 284 and winds around the entire length of the brass insert 284. As a result of traveling the lengthy path through the threads, the air is heated to a temperature that approaches the temperature of the cartridge heaters 287. When the heated air reaches the cone-shaped bottom 283, it flows through the small diameter bore 282. Small diameter bore 282 is connected to the hot air inlet 258 of the external hot air dispenser 250.

An embodiment of the external hot air dispenser 250 is shown in FIGS. 38–41. In this embodiment, the external hot air dispenser is formed from a unitary piece of material 251 which could be metal or plastic. The unitary piece of material 251 can be machined, cast or formed by a combination of casting and machining. Although a unitary piece of material 251 is used in this embodiment, it should be understood that the external hot air dispenser 250 could be fabricated from two or more separate parts that are assembled and secured together. A longitudinally extending nozzle section 252 is located along the back surface of the unitary piece of material 251. The term, back surface, being the surface that would not be visible when viewing the form-fill-seal machine from the front. The nozzle section 252 has a longitudinally extending flat bottom groove 259 formed therein along which a plurality of hot air exit openings 255 are located. The flat bottom groove 259 functions to channel the hot air flowing from the hot air exit openings 255 and keeps outside cold air out of the sealing area. The hot air exit openings 255 are the exit openings for channels 256 that are drilled into the flat bottom groove 259. Each channel 256 opens into a longitudinally extending bore 257 that functions as an hot air plenum. Longitudinally extending bore 257 is plugged at its ends. The unitary piece of material 251 includes an offset portion 253 at its upper end that includes a flat surface 249 into which counterbored hot air exit bore 247 is formed. A transverse bore 254 is formed through the offset portion 253 that intersects with longitudinally extending bore 257 and into which counterbored hot air exit bore 247 opens. The outer end of transverse bore 254 is plugged. A hot air inlet opening 258 is formed in front surface 248 of the unitary piece of material 251. As a result of this construction, hot air entering external hot air dispenser 250 through hot air inlet opening 258 fills the plenum formed by the longitudinal bore 257 and exits through the plurality of hot air exit openings 255. Hot air from the plenum formed by longitudinal bore 257 also flows into the transverse bore 254 and out the counterbored hot air exit bore 247. As shall be further discussed, the internal hot air dispenser 230 is secured to flat surface 249 such that its inlet opening 240 is aligned with counterbored hot air exit bore 247.

The internal hot air dispenser 230 is formed of two thin pieces of sheet metal 231 and 232. Sheet metal piece 231 is shown in FIG. 42. There is a tapered slot 233 cut into edge 243 of sheet 231 that terminates in a round hole 234. The second piece of sheet metal 232, as seen in FIG. 44, folds in half over sheet 231 such that it covers both surfaces of sheet 231. The folded edge 235 as well as the aligned edges 236–238 extend outwardly of the corresponding edges of sheet 231. Pieces 231 and 232 are formed of thin sheet metal and are assembled as shown in FIG. 44. Pieces 231 and 232 are spot welded together as indicated, in FIG. 43, by spot welds 239. The aligned edges 236, 237 and 238 are welded together to prevent the loss of hot air from the internal cavity of the internal hot air dispenser 230. An opening 240 is formed in one of the overlapped sides of sheet 232. Opening 240 is aligned with the round hole 234 of sheet 231. Mounting holes 245 are formed in the internal hot air dispenser 230 at location where they extend through sheet 231 and both layers of sheet 232. The internal hot air dispenser 230 is secured to exterior hot air dispenser 250 by fasteners, for example bolts, that extend through mounting holes 245 and into aligned mounting holes 246 located in the flat surface 249 of exterior hot air dispenser 250. When the internal hot air dispenser 230 is secured to the exterior hot air dispenser in this manner the counterbored hot air exit bore 247 of the exterior hot air dispenser 250 is aligned with hot air inlet opening 240 of the interior hot air dispenser. Hot air that flows through opening 240 enters the round hole 234 and flows through the tapered slot 233 between the overlapped sides of sheet 232 into a plenum 242. Plenum 242 is formed by edge 243 of sheet 231, folded edge 235 of sheet 232 and the spaced internal surfaces of sheet 232. It should be noted that the aligned edges 236 and 238 are each welded closed. A plurality of air exit openings 244 are formed in both overlapping surfaces of sheet 232 through which the hot air escapes. The plurality of openings 244 are substantially parallel to folded edge 235.

Standard form-fill-seal machines are adaptable to produce packages of various shapes and sizes by changing the forming tube and forming shoulder. The forming shoulder and tube assembly must however be mounted relative to other components of the machine with precision to ensure proper operation. Changing a form-fill-seal machine from one size package to another is, in the conventional machine, a time consuming task that requires a highly skilled machine operator. During the change over, the machine is, of course, not operating and thus the production from the machine is lost. An aspect of this invention is to provide a change part assembly 200 that can be removed quickly and easily and replaced when it is desired to change the package size being run on the form-fill-seal machine.

Figure 4:
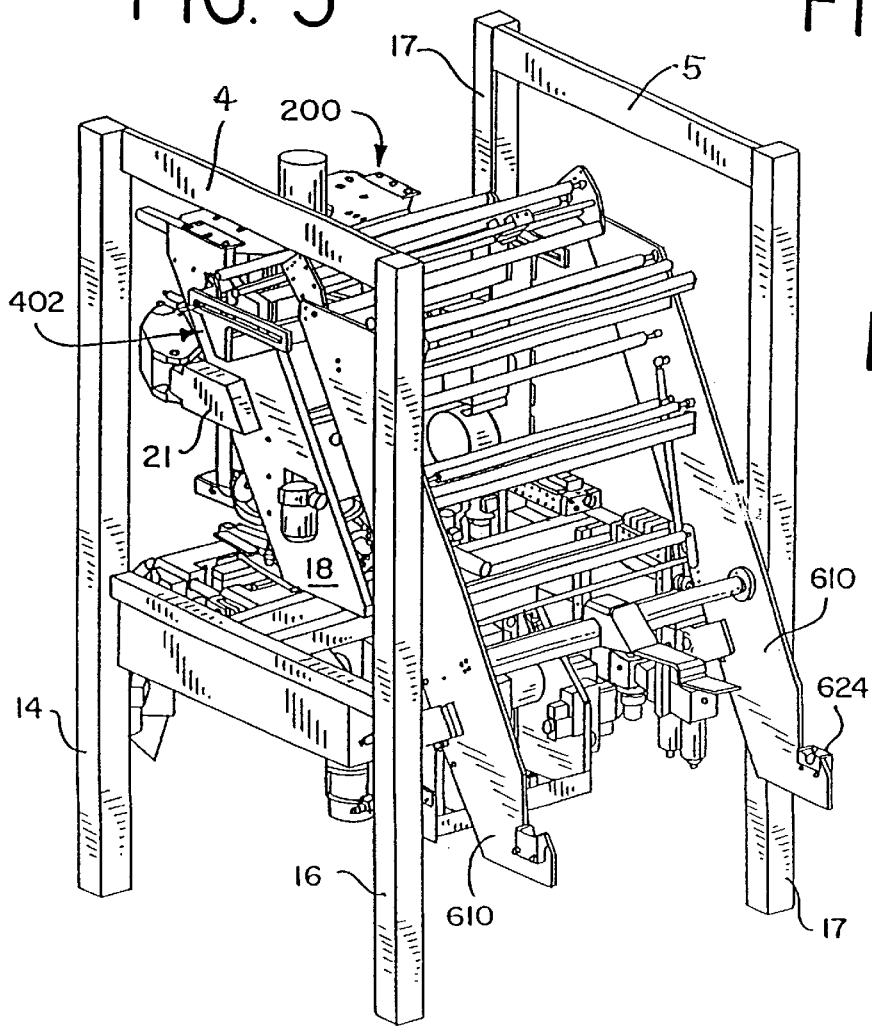
FIG. 4 is a perspective view of the form-fill-seal machine as seen from the front upper left.
Figure 7:
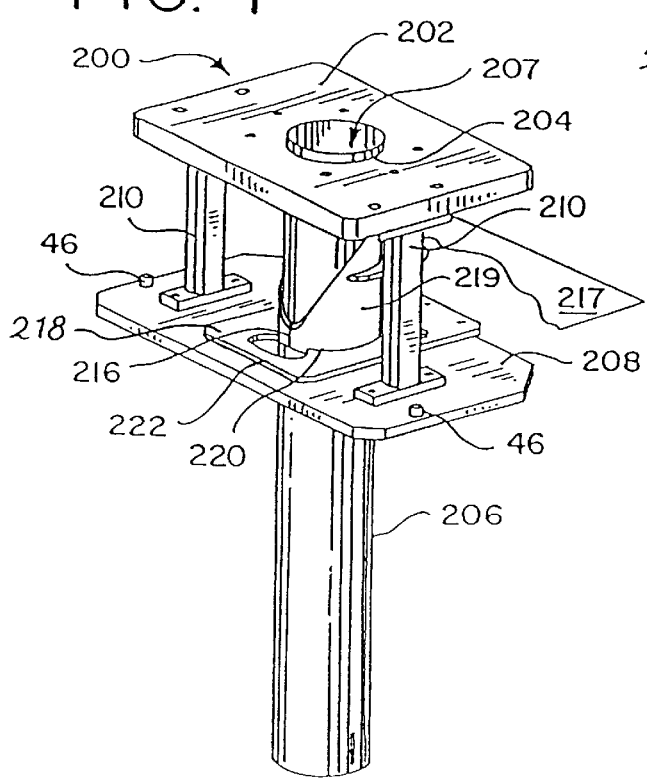
FIG. 7 is an isolated perspective view of a conventional change part mechanism as seen from the upper right.

The change part assembly 200 is seen mounted on the machine in FIGS. 1 and 4 and isolated in FIGS. 6 and 7. The change part assembly 200 includes a forming tube mounting plate 202 that has a faceted opening 204 formed therein. The forming tube 206 is secured to the forming tube mounting plate 202 within the faceted opening 204. The product to be sealed in the bags is loaded through the open end 207 of the forming tube 206. For a more detailed disclosure of a forming tube having a plurality of longitudinally extending flat surfaces of the type disclosed herein, reference may be had to U.S. Pat. No. 5,255,497, which patent is hereby included by reference as a part of this disclosure. A lower plate 208 is connected to forming tube mounting plate 202 by a pair of columns 210. Lower plate 208 has an aperture 209 (see FIG. 6) formed therein that is larger than the forming tube 206. The forming shoulder 214 is constructed by welding the shoulder portion 217 (see FIG. 6) to the collar shaped body portion 219 (see FIGS. 1, 4, 6 and 7). The shoulder portion 217 is not included in FIGS. 1 and 4, to more clearly show the surrounding components, and in FIG. 7 only the back edge portion is illustrated. The forming shoulder 214 surrounds the forming tube 206 and is spaced therefrom a sufficient distance to permit the film from which the package is formed to freely pass between the outer surface of the forming tube and the inner surface of the forming shoulder 214. The upper edge of the forming shoulder 214 dips down forming a V-shaped depression that converges to a vertical slot. The forming shoulder 214 is secured to a shoulder plate 218 that has a circular aperture 220 formed therein. An oval shaped aperture 222 is formed in the shoulder plate 218 adjacent the vertical slot 216. The shoulder plate 218 is secured to the lower plate 208. As is well known in the art, the film from which the package is formed is fed to the forming tube 206 from the film roll 625 that is located at the back of the form-feed-seal machine 10 as a flat sheet and is formed into a tubular shape by the forming shoulder 214. The open edges of the tubular shaped film extends through the vertically extending slot 216 and are sealed by the longitudinal seam sealer 20.

As best seen in FIG. 6 the bottom rim portion 215 of forming shoulder 214 extends below lower plate 208. The change part mounting mechanism includes aligning grooves and pins that insure the precise mounting of the change part 200 on the machine relative to the right 302 and left 303 vacuum drive belt assemblies. Numerous change part assemblies 200, of different shapes and sizes, can be mounted on the machine. However, the gap between the forming shoulder 214 and the forming tube 206 is consistent and the ratio of the outer dimension of the forming shoulder 214 and the forming tube 206 is consistent. Thus, the bottom rim portion 215 of each change part 200 includes reference surfaces that establishes a reference for that particular change part for a purpose to be further discussed.

Figure 8:
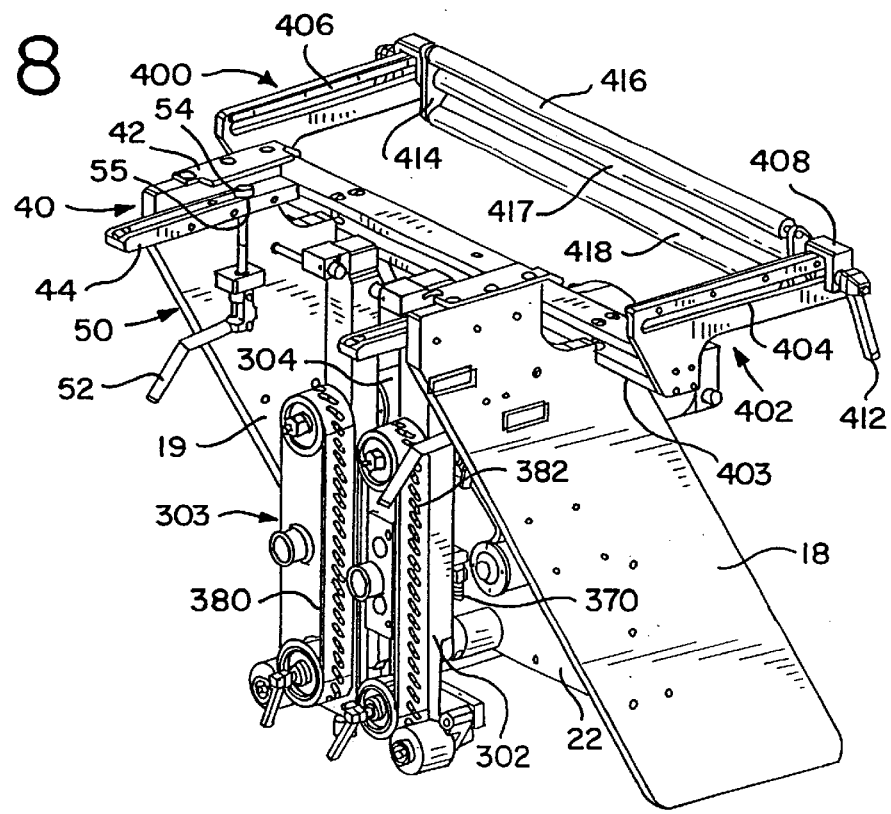
FIG. 8 is an isolated perspective view of the vacuum pull belt arrangement as seen from the front upper right.

Referring now to FIGS. 6, 7 and 8, the mounting of a change part assembly 200 on the machine will be discussed. The lower plate 208 of the change part assembly 200 is slid into slots 40 that are defined by the parallelogram shaped plates 18 and 19, upper plates 42 secured to the upper edge of plates 18 and 19 and bars 44 that are secured to the inner surfaces of the plates 18 and 19. The lower plate 208 has an upwardly projecting stud 46 on each edge that will slide into the slots 40. The upper plates 42 have notches 48 formed in their leading edges that are dimensioned to receive the studs 46. Toggle lock mechanisms 50, including handles 52 are mounted on the inner surface of each parallelogram-shaped plates 18 and 19 below the bars 44. The toggle lock mechanisms 50 include a rod 54 having a flat end that extends through cylindrical openings 55 formed in the bars 44. After the edges of bottom plate 208 are slid into slots 40 to the point where studs 46 are engaged in the notches 48, the handles 52 are moved to the locked position which causes rods 54 to extend upwardly through cylindrical openings 55 and secure the change part assembly 200 in place in the grooves 40. All components of this mounting arrangement are machined to precision and, as a result, the change part assembly 200 can be quickly and easily mounted on the machine in the correct position. This mounting arrangement provides a mounting mechanism that has a level of precision that permits a change part assembly 200 to be slid into the slots 40 and secured in place by the toggle lock mechanisms 50, and no further adjustment is required. This is a result of not only the precision machining of all mounting components, but also the fact that the change part assembly 200 is mounted at a location that is very close to the film belt drive assembly 300 and there are very few parts between the precision mount and the forming tube 206. In the prior art, the mounting members for the change part assemblies can not be relied upon to be consistently located. This is a result of their being supported through a series of connected parts, each of which has a manufacturing tolerance. As a result, the change part assemblies must be carefully adjusted and leveled with shims and the like. The mounting arrangement disclosed herein eliminates such steps by mounting the change part very close to the pull belts, greatly reducing the number of pieces therebetween. Furthermore, all engaging components of the change part mounting arrangement are precision machined surfaces. The range of variability has been greatly reduced and the interchangeability of the change parts has been greatly enhanced.

Figure 9:
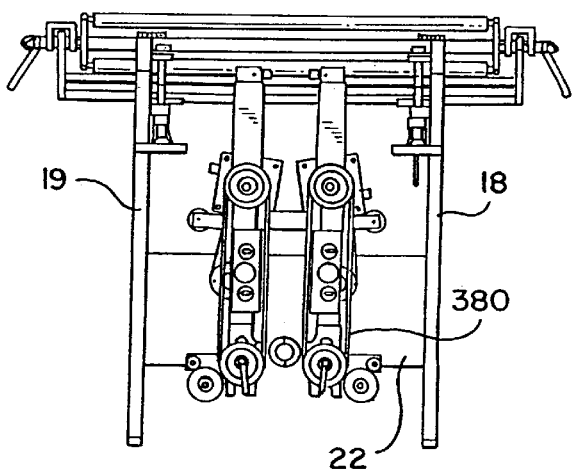
FIG. 9 is a front view of the vacuum pull belt arrangement that is seen in FIG. 8.
Figure 10:
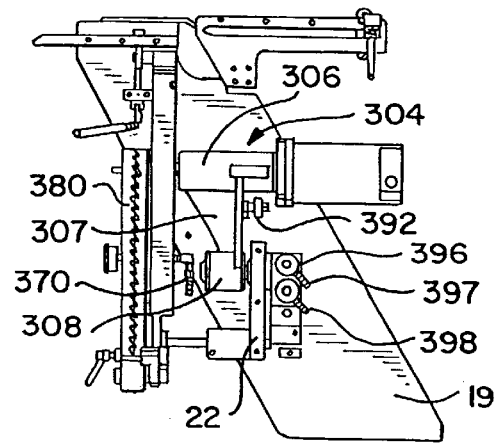
FIG. 10 is a side view showing the vacuum pull belt arrangement seen in FIG. 8.
Figure 11:
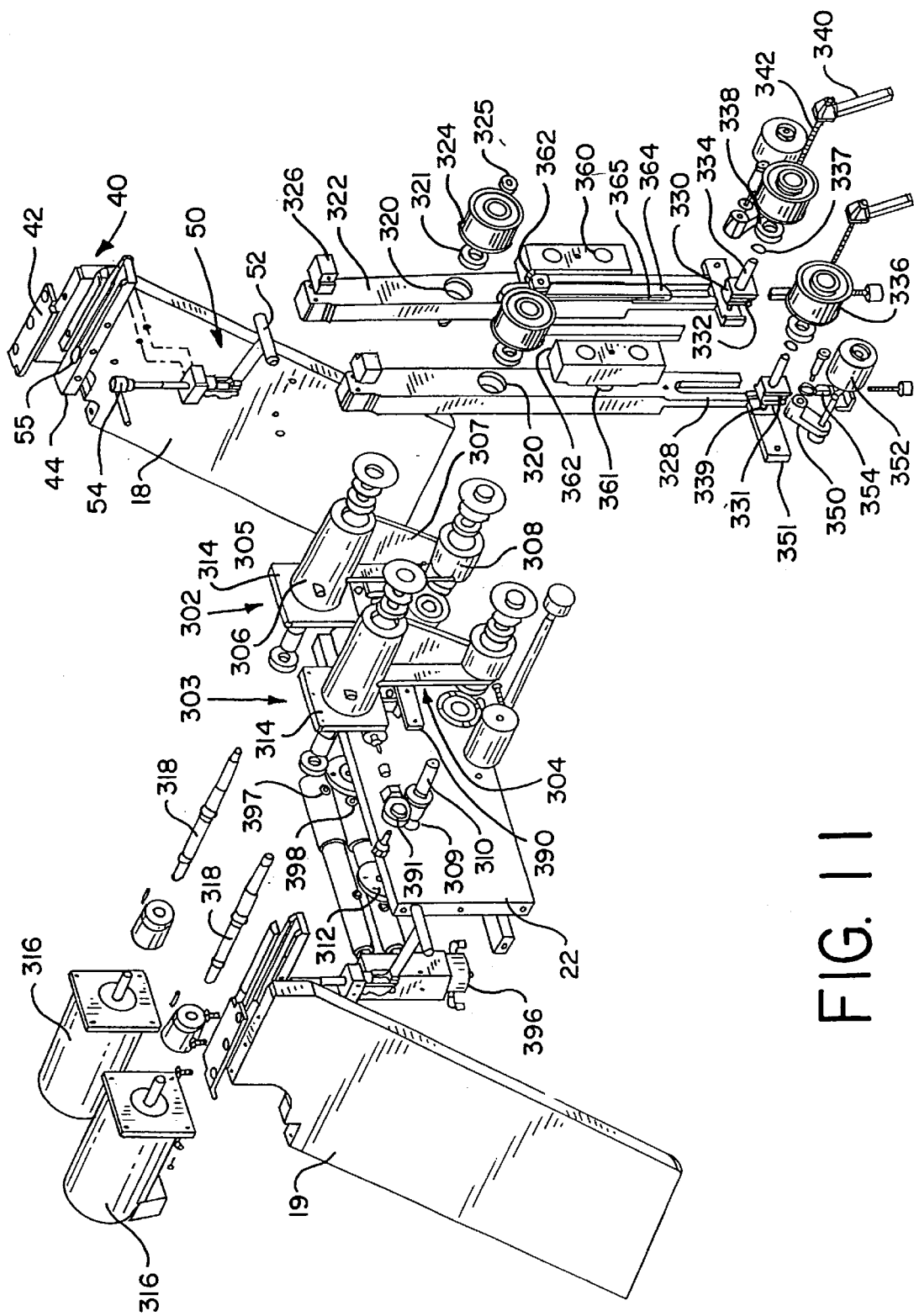
FIG. 11 is an exploded view of the film belt drive assembly.

As best seen in FIGS. 9, 10 and 11, a frame member 22, that lies in a vertically extending plane, is connected at its ends to the parallelogram shaped plates 18 and 19. The film belt drive assembly 300 is mounted on frame member 22. The film belt drive assembly 300 consists of a right 302 and a left 303 vacuum drive belt assembly. The right 302 and left 303 vacuum drive belt assemblies are virtual mirror images of each other and thus they will be described only once. The reference numbers for the various parts of the vacuum drive belts are divided between the right and the left assemblies to avoid crowding.

The vacuum drive belt assemblies 302, 303 will be described with reference to FIGS. 7–11. Each vacuum drive belt unit comprises a casting or mounting member 304 having an upper cylindrical member 306 and a lower cylindrical member 308 that are interconnected by an arm 305 that is reinforced by a web 307. The casting 304 is pivotally mounted on the vertical frame member 22 about lower cylindrical member 308. This mounting includes a shaft 310 that extends through an aperture 309 that is formed in frame member 22. The shaft 310 is secured to the back surface of vertical frame member 22 by a retainer flange 312. The rear end of upper cylindrical member 306 carries a shoulder plate 314 to which is secured a stepper motor 316. The stepper motors 316 drives the film drive shaft 318 that extends through the upper cylindrical member 306. The drive shafts 318 extends through openings 320 formed in the pulley supports 322 and the pulley drives 324 are secured at their free ends by lock nuts 325.

A biasing device is provided between the right 302 and left 303 vacuum drive belt assemblies for causing these assemblies to move relative to each other. This biasing device includes mounting arms 390 that are secured to the arms 305 of the vacuum drive belt assemblies 302, 303 and an air cylinder 392. The rod end 391 of air cylinder 392 is connected to mounting arm 390 of vacuum drive belt assembly 303 and the head end of cylinder 392 is connected to the mounting arm 390 of vacuum drive belt assembly 302. When cylinder 392 is expanded or retracted, the castings 304 are caused to pivot about lower cylindrical member 308. When cylinder 392 is expanded, the distance between the pulley supports 322 increases and when the cylinder 392 is retracted the distance between the pulley supports 322 decreases.

While setting the machine up for a different size package and during normal operation of the machine, cylinder 392 is biased in the direction to retract and thus cause the pulley supports 322 to move toward each other. After a change part assembly 200 has been mounted and secured in place, the cylinder 392 is retracted, causing the pulley supports 322 to move toward each other. As the pulley supports 322 move toward each other, the pull stops 326 approach the bottom rim portion 215 of forming shoulder 214. When the pull stops 326 engage the reference surfaces of the rim portion 215 of forming shoulder 214, the movement of the upper ends of pulley supports 322 stop. However, the lower ends of pulley supports 322 are still free to move. The pulley supports pivot about the engagement point of the pull stops 326 with the bottom rim portion 215 of the forming shoulder 214. This movement is stopped when the portions of continuous belts 380 that are overlaying the driven pulleys 336 make contact with the lower portion of the forming tube 206. The pull stops 326 and the bottom rim portion 215 of the forming shoulder 214 are formed with precision to insure that the surface of the continuous belts 380 are spaced from the surface of the forming tube 206 a distance of 0.02 of an inch at the pulley drives 324. Thus, there is a gap at the leading edge of the continuous belts 380 relative to the forming tube 206. A precession adjustment is built into the pull stops 326 to achieve more precise spacing, if required. This 0.02 of an inch spacing of the continuous belts 380 from the forming tube enables the film to be held against the continuous belts 380 by vacuum and out of engagement with the forming tube. This eliminates frictional drag between the forming tube 206 and the film. In the prior art, vacuum pull belts were mounted on housings that were slid back and forth on shafts. Accurate stop mechanisms were required to secure the pull belts such that there was a very small gap between the surface of the pull belts and the forming tube. Accomplishing this adjustment is a very tedious and time consuming task. Although in Applicant's device there is line contact of the continuous belts 380 with the forming tube 206 along the driven pulleys 336, this contact results in minimal frictional drag and can be tolerated. As a result of this arrangement, an unlimited number of change parts, of different shapes and sizes, can be used on a machine and the vacuum belt assemblies 302 and 303 will always be in proper adjustment because the proper adjustment is built into the change part itself.

The opening 320 carries a bearing 321 through which drive shaft 318 extends. The pulley support 322 extends upwardly from opening 320 and has pull stop 326 secured to its upper free end. The pulley support 322 also extends downwardly from opening 320 and terminates in a two-pronged fork 328. The prongs of the two pronged fork have square cross sections. An idler guide mount 330 having a pair of vertically extending grooves 331 and 332 formed therein and a pivot shaft 334 extending therefrom. The groves 331 and 332 of idler guide mount 330 receive the prongs 328 and provide a guide for vertical sliding of the idler guide mount 330. The driven pulley 336 is rotatably carried by pivot shaft 334 on idler bushing 337 and bearing 338. An adjusting handle 340 having a threaded shaft 342 extending therefrom extends through the driven pulley 336 and the pivot shaft 334 and is threaded into a threaded opening 339 formed in an idler mounting arm 342. The adjusting handle 340 can be loosened and then tightened when it is desired to adjust the position of the idler guide mount 330 on the prongs 328. The rear surface of the idler guide mount extends into a vertical groove formed in the idler mounting arm which allows the front surface of the idler mounting arm to engage the rear surfaces of forks 328 to fictionally secure the idler guide mount 330 in a selected location.

A brush mounting arm 350 is pivotally mounted at the free end of the idler mounting arm 351 and carries a pivotally mounted brush 352 at its free end.

A tension adapter 354 having a square cross section is provided for adjusting the tension in the pull belts 380. A threaded shaft having a thumb screw head is provided that permits manual adjustment of the tension adapted 354. The tension adapted 354 has a built in clutch that functions to limit the maximum amount of tension that can be applied to the pull belts 380.

Film drive mounting nozzles 360 are secured to the pulley supports 322 over openings 361 that are located between the openings 320 and the two pronged forks 328. A vertically extending slot 362 is formed in the vertical side of drive mounting nozzles 360 that faces the other vacuum feed drive assembly 302 or 303. A film drive nozzle 364 is secured in vertically extending slot 362. The film drive nozzle 364 has a vertically extending slotted opening 365 formed in its outer surface. There is an opening (not shown) in the rear surface of film drive mounting nozzle 360, aligned with opening 361, that communicates with a chamber (not shown) formed in film drive mounting nozzle 360. The chamber communicates with a slotted opening formed in the base of slot 362. The slotted opening formed in the base of slot 362 communicates with an opening or openings formed in the base of film drive nozzle 364. A vacuum fitting 370, see FIG. 10, extends through opening 361 and is secured in the aligned opening formed in the film drive mounting nozzle 360, such that when a vacuum hose is connected to vacuum fitting 370 a vacuum is created along the vertically extending slotted opening 365.

A continuous belt 380, see FIG. 8, having a series of diagonal slots 382 formed therein along its entire length, is mounted over the pulley drive 324 and the driven pulley 336. The continuous belt 380 passes over the vertically extending slotted opening 365 formed in film drive nozzle 364. During the time that a diagonal slot 382 is moving along the vertically extending slotted opening 365, there is a vacuum on the outer surface of the continuous belt adjacent this particular diagonal slot 382. As will be further discussed, the film from which the package is being formed is located adjacent the continuous belt 380 and the vacuum appearing through the diagonal slots 382 holds the film against the continuous belt 380 and moves the film downwardly along with continuous belt 380.

As is best seen in FIGS. 10 and 11, a vacuum generator assembly 396 that is mounted on the rear surface of vertically extending frame member 22, includes vacuum outlets 397 and 398 that are connected by hoses to the vacuum fittings 370 carried by the vacuum drive belt assemblies 302, 303.

Figure 21:
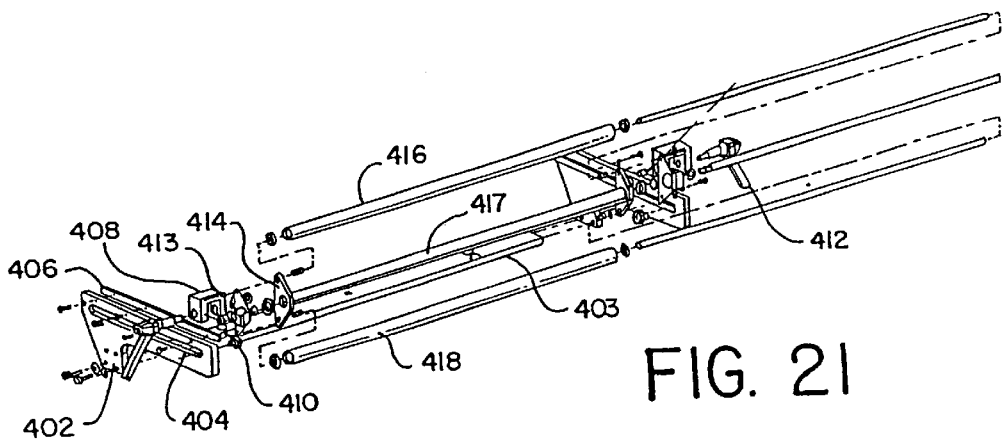
FIG. 21 is an exploded perspective view of the tension roller assembly.

The tension roller assembly 400 is shown in FIG. 8 mounted on the upper rear edges of the parallelogram-shaped plates 18 and 19 and as an exploded view in FIG. 21. The assembly 400 functions to control the tension in, and take slack out of, the film immediately before it reaches the forming shoulder 214. It is important that the film lie flat on the surface of the forming shoulder 214 and there are no air bubbles between the film and the surface of the forming shoulder 214. The assembly 400 includes rearwardly extending horizontal brackets 402 on each side that are connected by a tie bar 403. Brackets 402 have horizontal slots 404 formed therein and gear racks 406 secured to the brackets 402 along the upper edges of the slots. A roller frame clamp 408 is slidable along the upper edge of the brackets 402. A spur gear 410 is supported on each roller frame clamp 408 that meshes with its corresponding gear rack 406. The gear racks 406 and meshing spur gears 410 cause the roller frame clamp 408 to move in unison along the brackets 402. A handle 412 that is connected to a tension retainer mechanism 413 is provided for each of the roller frame clamps 408. Handles 412 can be turned to secure or release the roller frame clamp 408 at selected locations along the brackets 402. Triangular-shaped plates 414 are connected by a pivot shaft or torque tube 417. The pivot shaft or torque tube 417 is carried by the roller frame clamp 408 and can be pivoted relative thereto and secured in a selected adjusted position by handles 412. A pair of horizontally extending rollers 416 and 418 are carried by the triangular shaped plates 414. The film extends from the rear of the machine over the top roller 416 and then extends back and under the lower roller 418 from which it extends to the back edge of the shoulder portion 217 (see FIG. 7) of the forming shoulder 214. The roller frame clamps 408 and triangular-shaped plates 414 are adjusted such that the film that extends from the lower roller 418 to the lower edge of the shoulder 214 has a slight negative angle with the surface of the shoulder 214 which causes the film to maintain contact with the shoulder and eliminate wrinkles in the film. The roller frame clamp 408 can be adjusted along the brackets 402 and secured at a location at which the lower rod 418 is properly located relative to the forming shoulder 214 to insure that there is no slack in the film as it encounters the forming shoulder 214 and there are no air bubbles between the film and the surface of the forming shoulder 214.

Figure 17:
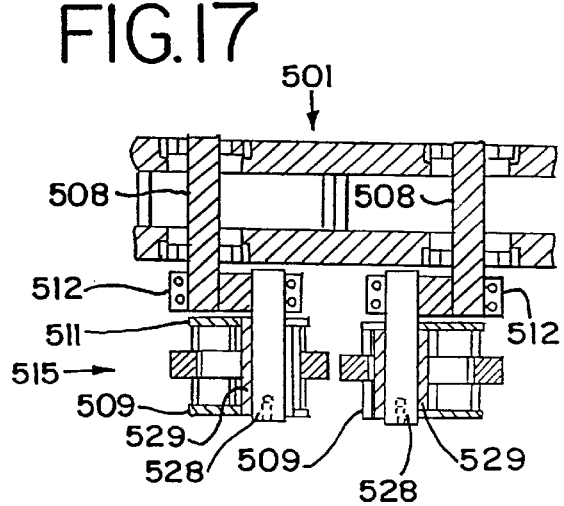
FIG. 17 is a cross-sectional view of a portion of the sealing jaw mechanism taken along lines 17—17 of FIG. 15.
Figure 18:
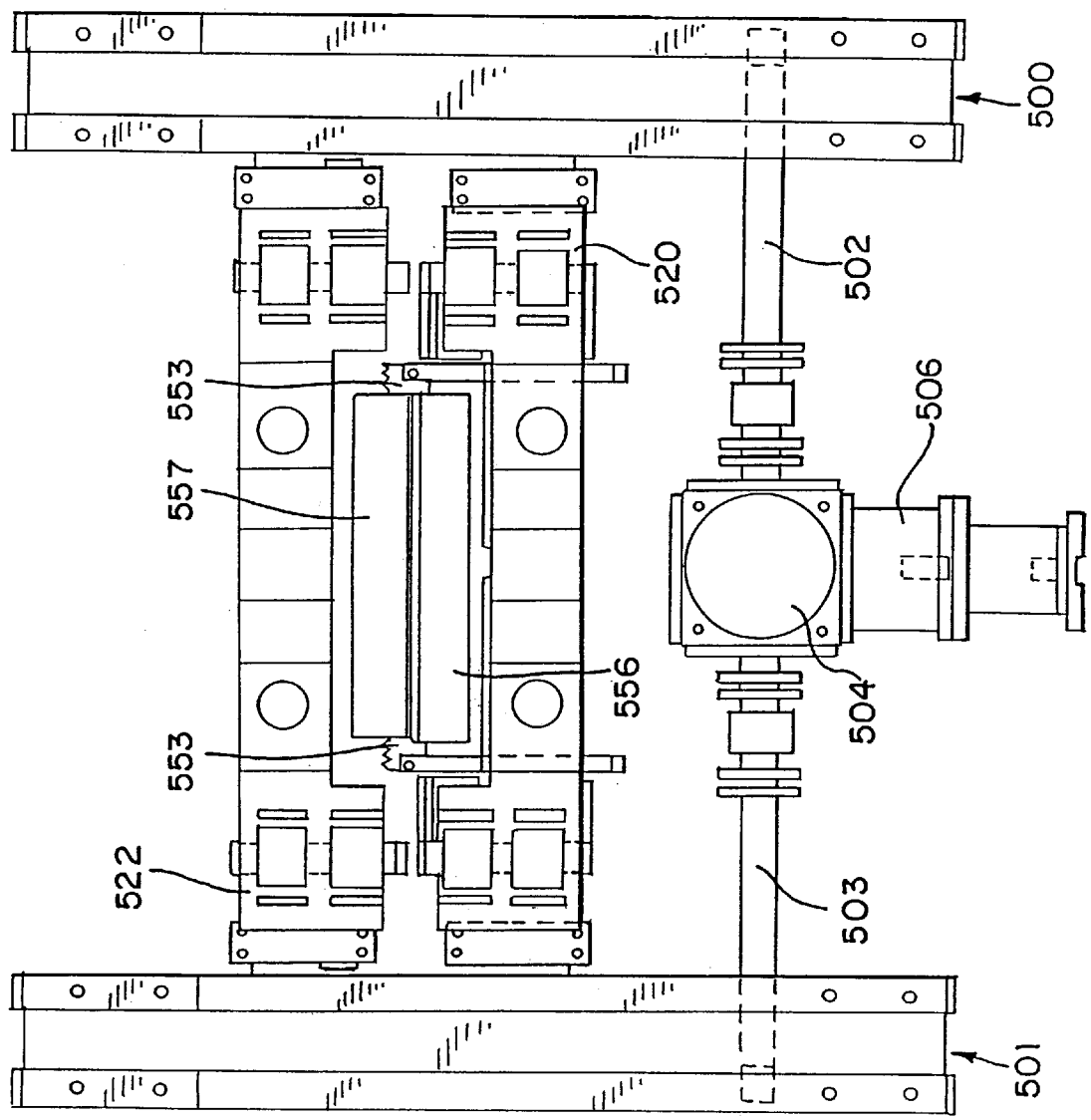
FIG. 18 is a top view of the isolated sealing jaw mechanism.
Figure 19:
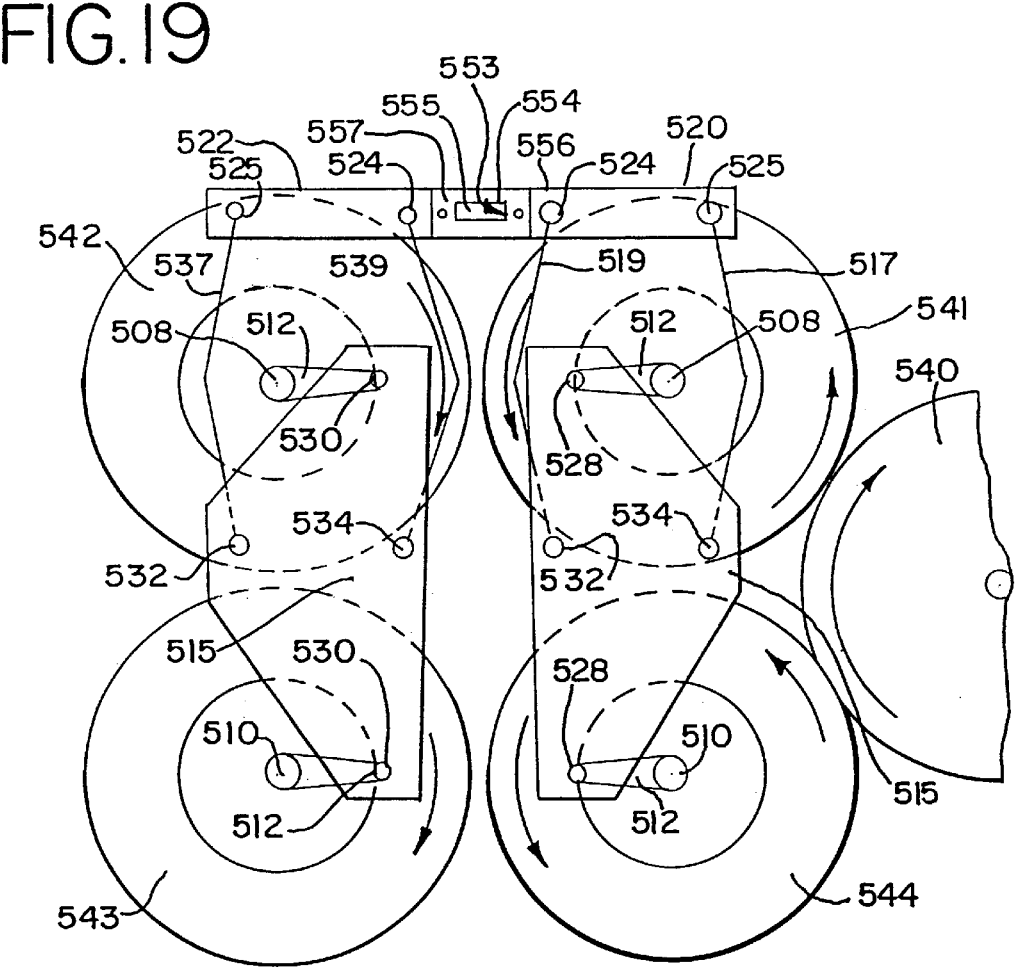
FIG. 19 is a right side schematic view of the sealing jaw mechanism 100 and drive.
Figure 20:
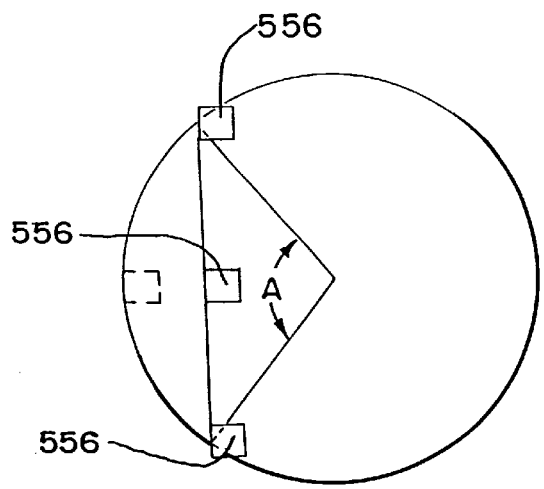
FIG. 20 is a schematic view that illustrates the geometry of the torsion mounts and parallel linkage drive.

The sealing jaw mechanism 100 is shown in FIGS. 12–20. FIGS. 12–18 are views of the preferred embodiment of the sealing jaw mechanism 100 and its drive. FIGS. 19 and 20 are schematic views of the sealing jaw mechanism 100 and drive.

Figure 12:
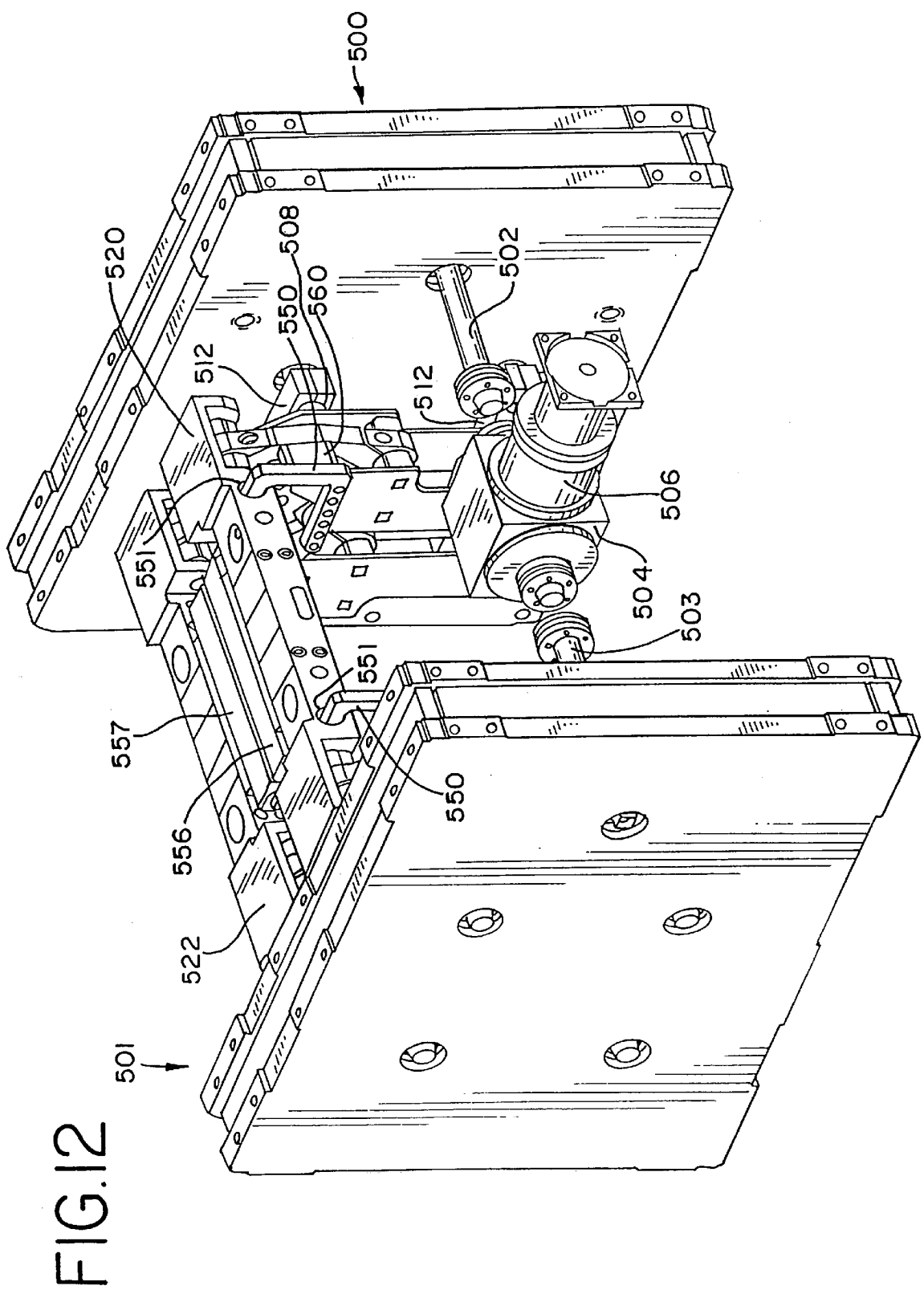
FIG. 12 is a perspective view of the isolated sealing jaw mechanism as seen from the back upper right.

Referring to FIG. 12, which is a view from the rear, the left gear case 500 and right gear case 501 of the sealing jaw mechanism 100 are shown. Gear cases 500, 501 and, thus, the entire sealing jaw mechanism 100, are secured by nuts and bolts (not shown) to the lower support members 2 and 3 and vertical columns 14–17 (see FIG. 1) of the form-fill-seal machine 10. Input shafts 502 and 503 are driven through a gear box 504 by a servo motor 506. The servo motor 506 is controlled through a programmable microprocessor which enables the speed and drive intervals to be precisely controlled. The front sealing jaw 557 carried by the front jaw bracket or cyclically moveable jaw assembly 522, together referred to as the front jaw assembly 546, and the rear sealing jaw 556 carried by the rear jaw bracket or cyclically moveable jaw assembly 520, together referred to as the rear jaw assembly 548, are located between the gear cases 500, 501, as best seen in FIGS. 12 and 18. Each gear case 500, 501 has two sets of spaced output shafts. Each set of spaced output shafts has an upper output shaft 508 and a lower output shaft 510. The forward set of spaced output shafts on both gear cases 500 and 501 drive the front jaw bracket or cyclically moveable jaw assembly 522 and the rear set of spaced output shafts on both gear cases 500 and 501 drive the rear jaw bracket or cyclically moveable jaw assembly 520. Each of the output shafts 508 and 510 has a crank arm 512 rigidly secured thereto.

The gear cases 500, 501, their output drives and the drives to the cyclically moveable jaw assemblies 520 and 522 are mirror images of each other. For this reason, reference will be made to FIGS. 13 and 14 for a detailed discussion of the drive from the right gear case 501 to the right side of rear jaw bracket or cyclically moveable jaw assembly 520. It should be understood that the drive to the left side of rear jaw bracket or cyclically moveable jaw assembly 520 and to both sides of front jaw bracket or cyclically moveable jaw assembly 520 are identical, to the drive described in detail.

The set of output shafts, comprised of upper 508 and lower 510 parallel and spaced output shafts, project from gear case 501. Output shafts 508 and 510 are synchronously driven in rotary movement. Each output shaft 508, 510 has a crank arm 512 rigidly secured thereto.

The free ends of crank arms 512 carry an upper 528 pivot shaft, and a lower pivot shaft 530. Pivot shafts 528 and 530 are pivotally connected to a linkage base 515. The linkage base is fabricated from spaced parallel plates 509 and 511. An upper bearing 529 and a lower bearing 531 are secured to and span the space between the spaced parallel plates 509 and 511. Upper pivot shaft 528 is received in upper bearing 529 and the lower pivot shaft 530 is received in lower bearing 531. The linkage base 515 also includes front 532 and rear 534 mounts that are secured to the spaced parallel plates 509 and 511 and span the space there between. Mounts 532 and 534 have non circular cross sections. Although, as illustrated, mounts 532 and 534 have square cross sections they could have any non circular cross section. The lower ends of front pivot links 519 and rear pivot links 517 are connected to the linkage bases 515 through its front mount member 532 and rear mount member 534 respectively.

Figure 14:
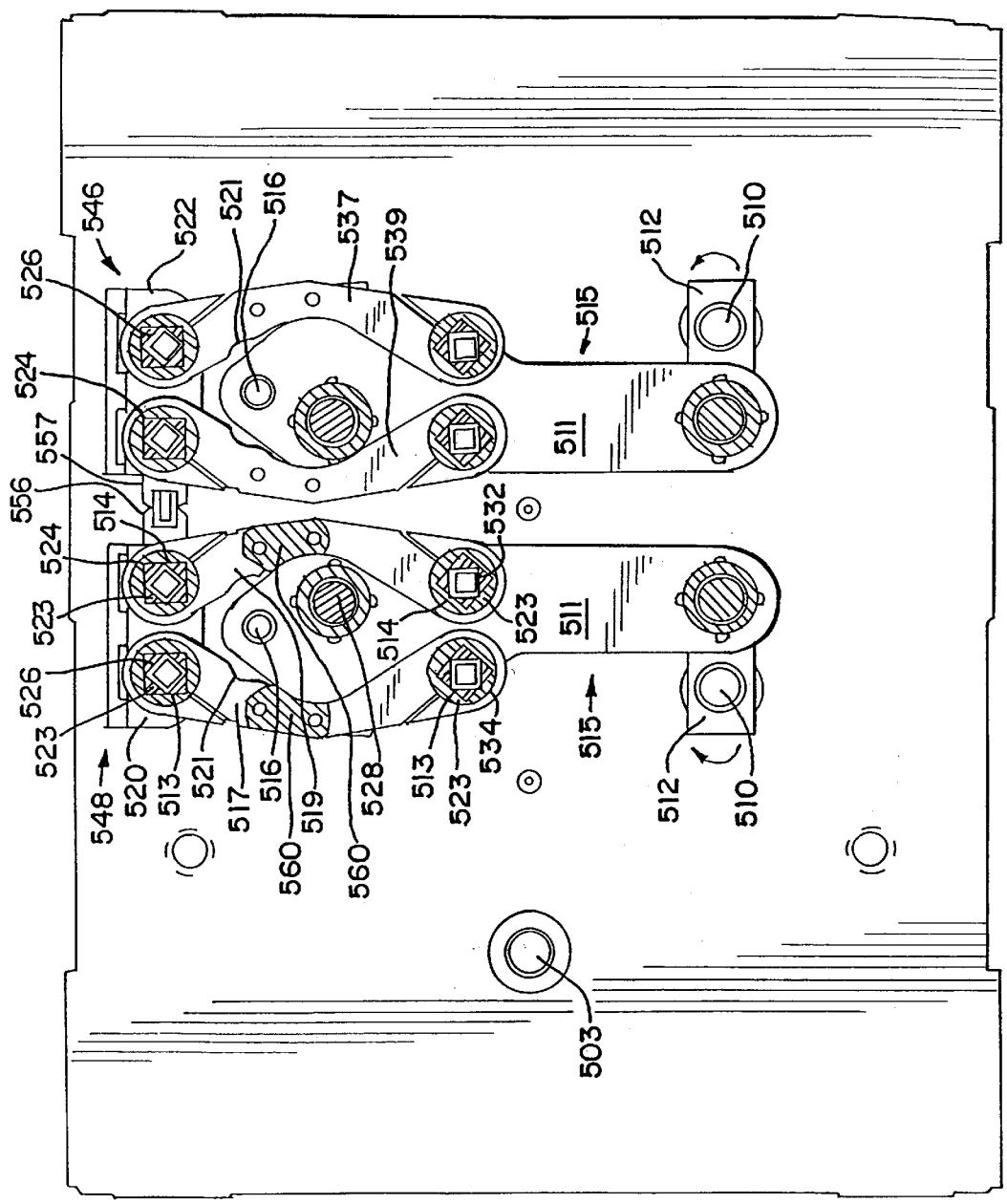
FIG. 14 is a cross-sectional view of the sealing jaw mechanism taken along lines 14—14 of FIG. 13.

The front jaw bracket or cyclically moveable jaw assembly 522 that carries the front sealing jaw 557 and the rear jaw bracket or cyclically moveable jaw assembly 520 that carries the rear sealing jaw 556 are best seen in FIGS. 12 and 18. As best seen in FIG. 14, rear jaw bracket or cyclically moveable jaw assembly 520 has a front mount member 524 and a rear mount member 526 upon which the upper ends of rear parallel link 519 and 517 are, respectively, connected. The front jaw bracket or cyclically moveable jaw assembly 522 has a front mount member 524 and a rear mount member 526 upon which the upper ends of front parallel link 539 and rear parallel link 537 are respectively connected.

Both ends of pivot links 517 and 519 have circular openings 513 and 514 respectively formed therein. The pressure devices that are mounted in each opening 513 and 514 are identical. The following description of the pressure device that is mounted in opening 513 formed in the upper end of pivot link 517, with particular reference to FIGS. 29 and 30, applies equally to the other pressure devices. Opening 513 has a slot 527 that opens to the edge of pivot link 517. A clamping bolt 518 is provided that can close the slot 527 to secure metallic cylindrical member 525 into the openings 513. Cylindrical member 525 has an axially extending non-circular opening 533 formed therein. Opening 533 is illustrated as being square, however, it could be any non circular shape. A metallic rod member 535, having a non circular outer cross section shape is received in non circular opening 533. Rod member 535 is dimensioned such that it can rotate within opening 533 about its longitudinal axis relative to member 525. Metallic rod member 535 is illustrated as having a square outer cross section shape, however other non circular cross section shapes could be used. A plurality of elastic members or rubber torsion mounts 523, having cross section shapes that substantially fill the spaces left in opening 533 by rod member 535, are located between opening 533 and rod member 535. Rod member 535 has a non circular axial openings 536 formed therein that is shaped to receive mount 524. Mount 524 is carried by the jaw bracket or cyclically moveable jaw assembly 520 which is secured to the upper ends of pivot links 517 and 519. When the pressure device is contained in the opening 513, as shown in FIG. 30, the elastic members or rubber torsion mounts 523 are at equilibrium and will attempt to locate the pair of cyclically moveable jaw assemblies at an equilibrium position relative to the corresponding link bases. The link bases 515, parallel links 517 and 537 and pivot connections including said pressure devices function to bias said pair of cyclically movable jaw assemblies toward each other in arcuate paths while maintaining one jaw assembly parallel with respect to the other jaw assembly. The clamping bolts 518 can be loosened, the pressure devices rotated within the circular openings 513 and the clamping bolts again tightened. This results in a means for adjusting the pressure exerted by said cyclically movable jaws toward each other independently of said jaw assembly equilibrium position.

The rear linkage base 515, as seen in FIG. 14, has a front mount member 532 and a rear mount member 534 upon which the lower ends of parallel link 519 and 517 are respectively connected. The bottom ends of pivot links 517 and 519 have circular openings 513 and 514 respectively formed therein that also receive pressure devices including metallic cylindrical members 525, rod members 535 and torsion mounts 523 as fully described above.

A stop 516 is also secured to and spans the space between the spaced parallel plates 509, 511 of each linkage base 515. Stops 516 are cylindrically shaped rods and are easily replaced with stops of different diameters for a purpose to be discussed. An arrows in FIG. 14, around the lower output shafts 510, for the rear jaw bracket or cyclically moveable jaw assembly 520, indicates that the direction of rotation for both output shafts 508 and 510 (508 not visible in FIG. 14) is clockwise. It should be noted that the output shafts 508 and 510 for the front jaw bracket or cyclically moveable jaw assembly 522, as seen in FIG. 14, rotate in the opposite or counter clockwise direction. The rotation of the output shafts 508, 510, crank arms 512 and pivot shaft 528 cause the linkage bases 515 to rotate in circular paths.

As a result of the output shafts 508, 510 for the front jaw bracket or cyclically moveable jaw assembly 520 and rear jaw bracket or cyclically moveable jaw assembly 522 rotating in opposite directions, the linkage bases 515 also rotate in opposite directions. The rotational direction of the linkage bases 515 is such that they approach each other during the upper half of their orbit and recede from each other during the lower half of their orbit.

The rubber torsion mounts 523 included in the connections of the upper and lower ends of each parallel link 517,519,537,539 bias the parallel links 517 and 537 into contact with stops 516. Stop engaging portions of parallel links 517 and 537, having notches 521 formed therein, engage the stops 516. When the stop engaging portions of parallel links 517 and 537 are in engagement with the stops 516 movement of said cyclically movable jaw assemblies to their equilibrium position is prevented. The rubber torsion mounts 523 permit links 517 and 537 to move away from the stops 516 as shall be further discussed. However, the rubber torsion mounts always bias the links 517 and 537 back into engagement with the stops 516.

The parallel links 517,519,537,539 have notches 521 formed therein that are located and dimensioned to receive the stop 516 that is carried by the linkage bases 515. Engagement of the notches 521 with stops 516, as a result of torque transmitted to parallel links 517,519,537,539 by the rubber torsion mounts 523, establishes a fixed limits for this movement relative to their linkage bases 515.

The front and rear linkage bases 515 are dimensioned and located relative to each other such that they can rotate in their circular paths without interfering with each other. However when notches 521 are in engagement with stops 516, the front 557 and rear 556 sealing jaws which are carried by the front jaw assembly 546 and rear jaw assembly 548 respectfully, would theoretically interfere with each other during the cycle of the linkage bases 515. The initial contact of front 557 and rear 556 sealing jaws is represented in FIG. 19. As illustrated in FIGS. 19 and 20 initial contact of front 557 and rear sealing jaws occurs at about 54/ above horizontal. As best illustrated in FIG. 20 the sealing jaw 556 moves vertically downwardly, along a cord 657, after initial contact with sealing jaw 557 to the point, which is about 54/ below horizontal where it intersects the circular arc that it normally follows. As a result, as illustrated in FIG. 20 the sealing jaws travel vertically downwardly for a total arc of about 108/ which is about 30% of the total mechanical cycle. The length of the cord 657 can be adjust to accommodate different operating conditions by replacing the cylindrically shaped stops 516 with larger or smaller cylindrically shaped stops. A smaller diameter stop 516 will result in a shorter cord 657 and a larger diameter stop 516 will result in a longer cord 657. Actual interference is avoided since, upon engagement of the front 557 and rear 556 sealing jaws, the rubber torsion mounts 523 allow the parallel links 517 and 537 to back away from engagement with stops 516. Initial engagement of the sealing jaws 557 and 556 commence as the sealing jaws 557 and 556 are moving downwardly. The sealing phase of the cycle begins at this initial engagement of the sealing jaws 557 and 556 and continues until the parallel links 517 and 537 start moving back toward engagement with stops 516. The rubber torsion mounts 523 in the link mounts allow the sealing jaws 557 and 556 to remain engaged under pressure and move vertically downwardly during the entire sealing phase. During the sealing phase the notches 521 of parallel links 517 and 537 do not engage stops 516. The speed of servo motor 506 is set by the micro processor controller during the sealing phase such that the downward movement of the sealing jaws 557 and 556 is synchronized with the downward movement of the tubular container being formed. The parallel links 517 and 539 begin moving back toward the stops 516 at the completion of the sealing phase. At the point in the cycle when the rubber torsion mounts 523 cause the sealing jaws 557 and 556 to begin moving away from each other the sealing phase has been completed. At this point in the cycle the servo motor 506 can be sent a signal by the micro processor controller to increase its speed for the non sealing phase of the cycle. The speed of the jaws can be slowed down as they approach each other to thereby reduce the sound that is created when they engage. As a result the sealing phase of the cycle can be set to have an optimum or maximum duration for the product being produced. Stops 516 can be made of rubber or plastic, such as nylon, which provides the advantage of diminishing the sound created when they are engaged.

A knife blade 553 is fixed relative to the rear linkage bases 515 and thus its movement is not effected by the rubber torsion mounts 523. When the parallel links 517 and 537 are in engagement with stops 516 the knife blade 553 is nested within a horizontal groove 554 formed in the front vertical surface of the rear sealing jaw 556. The front sealing jaw 557 has a horizontal blade receiving groove 555 formed therein that is aligned with horizontal groove 554 when the sealing jaws 557 and 556 are engaged. Each end of knife blade 553 is secured to a free end portions of the top leg of a U-shaped mounting brackets 550. As best seen in FIG. 12, the bottom legs of U-shaped mounting brackets 550 are mounted by pivot shafts on the front 519 and rear links 517. As best seen in FIGS. 12 and 13 links 517 and 519 have offset mounting blocks 560 that extend centrally such that the mounting brackets 550 are located centrally of the link bases 515. Link 517 and 519 each carry a mounting bracket 550 that moves together with the links. The upper horizontal legs, of the U-shaped mounting brackets 550, extend through horizontal bores 551 formed in the rear jaw bracket or cyclically moveable jaw assembly 520. The free end of the upper horizontal legs, that extend through horizontal openings 551, are secured to the knife blade 553. The lower horizontal legs, of the U-shaped mounting brackets 550 are pivotally connected by pivot pins 561 to links 517 and 519. As a result of the pivot mounting of the mounting bracket 550 on links 517 and 519, the distance of movement that is imparted to the knife blade 553 depends on the distance from the pivot pins 561 to pivot points of the corresponding links 517 and 519. This relationship allows the knife 553 to retract less then the jaws 556 and 557 during the engagement of the jaws 556 and 557 and thus allows the knife to pass through the center line between the jaws 556 and 557 to sever the film. When the sealing jaws 557 and 556 initially engage, resulting in the horizontal component of movement of rear sealing jaw 556 to cease, the knife blade 553 continues to move forward until the jaws reach the center to their vertical travel. The continued movement of knife blade includes a horizontal component and knife blade 553 thus moves out of the horizontal blade mounting groove 554 formed in the rear jaw bracket or cyclically moveable jaw assembly 520. As the knife blade 553 moves out of the horizontal blade groove 554 it moves into horizontal blade groove 555 that is formed in the front surface of front sealing jaw 557. In doing so the knife blade 553 perform its cutting function.

Figure 15:
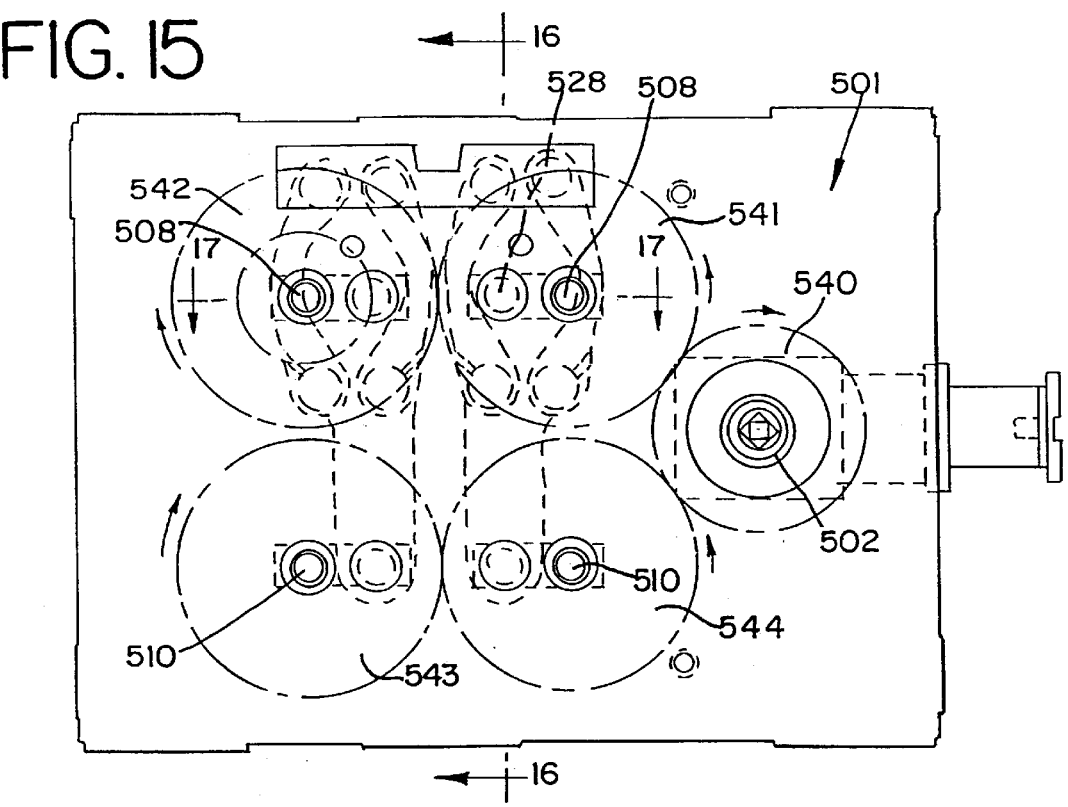
FIG. 15 is a side view of the right side of the isolated sealing jaw mechanism.
Figure 16:
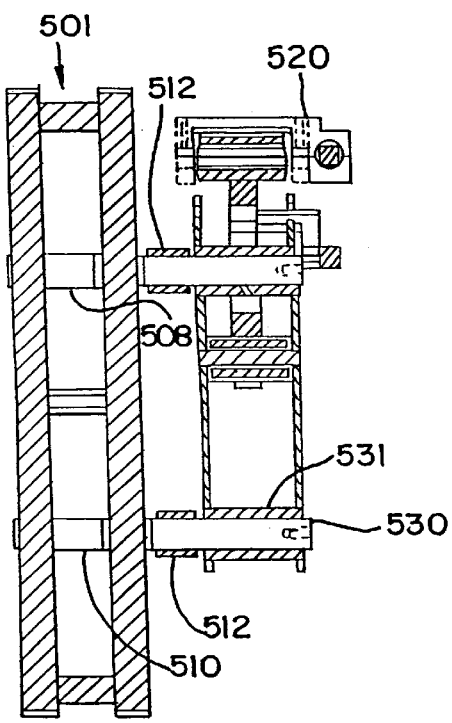
FIG. 16 is a cross-sectional view of a portion of the sealing jaw mechanism taken along lines 16—16 of FIG. 15.

The gear cases 500 and 501 will be discussed with reference to FIGS. 15 through 17. Each gear case 500, 501 includes a driver gear 540 that is carried by input shafts 502 and 503 respectively. The speed of driver gear 540 in each gear case 500 and 501 will always be identical and under the control of servo motor 506. As seen in FIG. 15 driver 540 rotates in the clockwise direction. Driver gear 540 meshes with and thus drives upper rear drive gear 541 and lower rear drive gear 544. Upper rear drive gear 541 and lower rear drive gear 544 are identical, that is they have the same diameter and the same number of teeth, and thus are driven at equal speeds by driver 540. Both upper rear drive gear 541 and lower rear drive gear 544 are driven in the counter clockwise direction. Upper rear drive gear 541 is secured to upper output shaft 508 and lower rear drive gear 544 is secured to lower output shaft 510. Upper rear drive gear 541 meshes with upper front drive gear 542, which is identical to upper rear drive gear 541, and thus drives upper front drive gear 542 at the same speed but in the opposite, clockwise, direction. Upper rear drive gear 542 is secured to upper output shaft 508 and lower rear drive gear 543 is secured to lower output shaft 510. Lower rear drive gear 544 meshes with lower front drive gear 543 and thus drives lower front drive gear 543 at the same speed but in the opposite, clockwise, direction. It should be noted that, to simplify FIG. 16, upper rear drive gear 541 is not shown on the output shaft 508 and lower rear drive gear 544 has not been shown on output shaft 510. It should also be noted that, to simplify FIG. 17, upper rear drive gear 541 and upper front drive gear 542 have not been shown on the output shafts 508.

Figure 5:
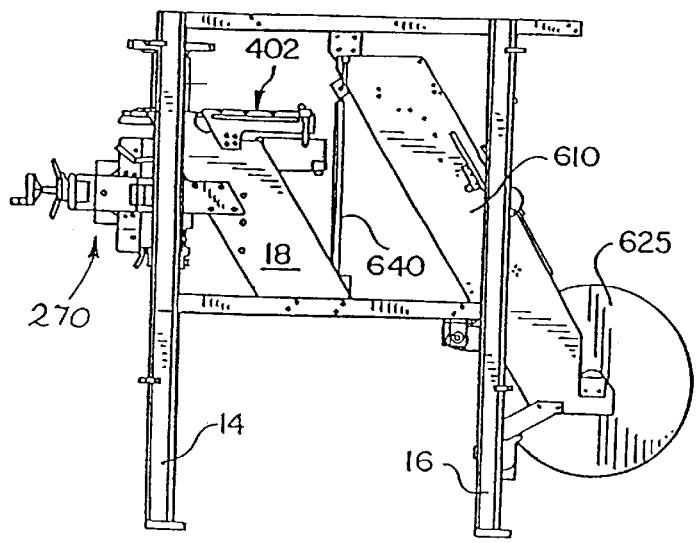
FIG. 5 is a right side view of the form-fill-seal machine.

The film cage 600, see FIG. 24, includes a pair of side plates 610 that are maintained in relative parallel relationship by a cylinder bar mounting 602, rollers 604, 605 and 606. The film cage 600 is pivotally mounted on the rear support member 11 of the form-fill-seal machine 10. The pivotal connection between the frame 11 of the form-fill-seal machine 10 and the film cage 600 can be seen in FIGS. 1, 4 and 5 and in FIG. 22 which is an exploded view of the mounting mechanism and the film tracking assembly.

Figure 22:
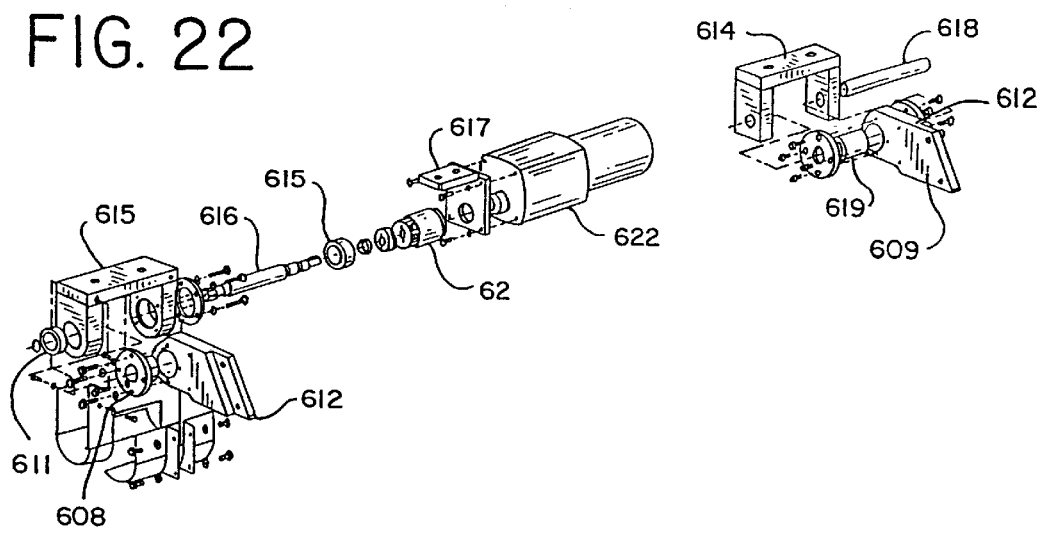
FIG. 22 is an exploded perspective view of the film tracking assembly.

As is best seen in FIG. 22, a right 609 and a left 612 film cage support are secured, for example by nuts and bolts to apertures 613 formed in the lower front edges of side plates 610 (see FIG. 24). The right film cage support 609 has a bore at its forward end that carries a bearing 619. The left film cage support 612 has an internally threaded adjustment nut 608 secured in a bore at its forward end. Film cage adjusting brackets 614 and 615 and the motor mounting bracket 617 are, as best seen in FIG. 1, secured to the rear support member 11 of the form-fill-seal machine 10. The right film cage adjusting bracket 614 includes downwardly extending spaced flanges that have aligned apertures that receive an idler shaft 618 upon which the bearing 619 can slide axially. The left film cage adjusting bracket 615 includes downwardly extending spaced flanges that have aligned apertures that receive an externally threaded drive shaft 616 that meshes with the internally threaded adjustment nut 608. Externally threaded drive shaft 616 is driven through a flexible coupling 620 and gears by a motor 622 that is carried by the motor mounting bracket 617. When motor 622 is actuated it causes rotation of externally threaded drive shaft 616 which causes the internally threaded adjustment nut 608 to move axially along the externally threaded drive shaft 616. The axial movement of adjustment nut 608 carries the entire film cage 600 with it. It should be noted that the range of axial movement of the film cage is limited by the space between the downwardly extending spaced flanges on the brackets 614 and 615. The externally threaded drive shaft 616 is driven through a flexible coupling 620 and gear box by the motor 622. Upon actuation of motor 622 the film cage 600 is moved to the right or left adjust or correct the tracking of the film. A very important advantage of the subject invention is that as a result of the film tracking and pivoting of the film cage being performed on the same axis, the film cage 600 can be pivoted between the operative and loading position without disrupting the adjustment of the film tracking. As a result of both systems being on the same axis, either can be adjusted without placing stress on or changing the adjustment of the other. As a result when a film roll is used up, the operation of the machine is stopped and the film cage 600 is pivoted to the vertical loading position.

At this vertical position the spent roll is removed and a new role 625 is rolled up to the rear of the machine. With the film cage 600 in the vertical loading position, the film roll mounts 624 have been lowered to a height where a new film roll 625 can be rolled onto the mounts 624 without lifting the role.

The film from the new film role must then be threaded through the plurality of rollers of the film cage. This procedure has been simplified as a result of the film cage now being in the vertical position since the film cage and the rollers are closer to the operator who is behind the machine. In prior art machines, the film cage and associated rollers are inclined toward the center of the machine and the person threading the film through the rollers must reach into the center of the machine to reach the rollers. Furthermore, with the film cage 600 in the vertical loading position, the person threading the film can grasp a dancer arm 644 or 645 and pivot it to the horizontal position at which position the dancer rolls 630 and 632 are much closer to the person and there is an open horizontal slot between the dancer rolls 630, 632 and the roll 605 that they interact with through which the film can be threaded. After the film from the new film role 625 has been threaded and spliced to the end of the old film, the film cage 600 can be pivoted to the operative inclined position. The adjustment of the film tracking has not been changed or disturbed in any way and the machine can be restarted without making time consuming adjustments.

Figure 25:
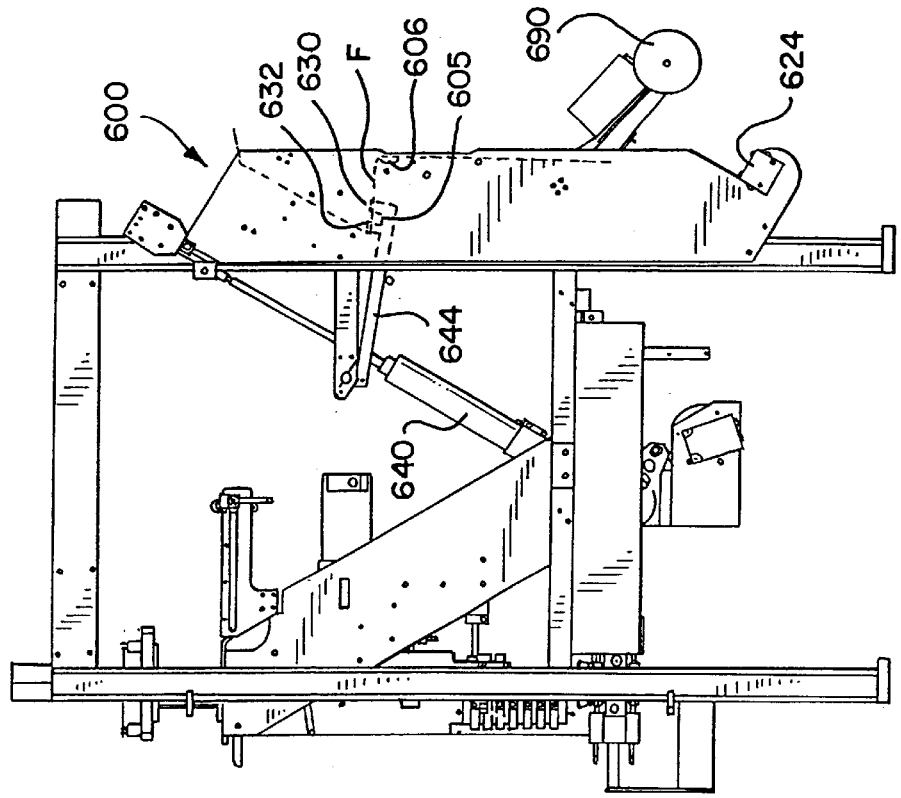
FIG. 25 is a schematic side view of the machine with the film cage in the vertical loading position when the film is not loaded.

The rod end of a pneumatic air cylinder 640, see FIG. 25, is pivotally connected to the cylinder bar mounting 602 at the top front of the film cage 600. The head end of cylinder 640 is secured to the mid support member 9 of the machine 10. Actuation of cylinder 640 pivots the film cage 600 about shafts 616 and 618 from the inclined operative position to the vertical film roll loading position.

The film roll loading position of the film cage 600 provides the advantage that the position of the film roll mounts 624 have pivoted down about the axes of shafts 616 and 618 to a lower level. At this lower level of the film roll mounts 624 it is possible to mount new film rolls 625 on the mounts 624 without the need of an overhead hoist or other such power equipment. Thus, when it is necessary to load a new film roll 625 on the machine 10, the machine operator can without additional help or special power equipment simply roll the new film roll 625 onto the film roll mounts 624.

Another advantage that is gained by moving the film cage 600 to its vertical film roll loading position is that it greatly facilitates the threading of the film through the series of rollers that controls the film. As a result of tilting the film cage to its vertical position, the rolls are much closer to a person located at the rear of the machine 10 and, thus, it is not necessary for the person loading the film to reach into the center of the machine to thread the film around the rollers. A particular difficult set of roller to load the film around are those known as the dancer rollers 630 and 632. The dancer rollers 630, 632 are not fixed relative to the film cage side plates 610 but rather are carried at the ends of dancer arms 644 and 645 that are pivotally mounted to allow them to float.

The dancer rollers 630 and 632 and their mounting mechanism are best seen in FIG. 24 and exploded view FIG. 23. Arms 634 are secured to side plates 610 and extend from the front edges of the side plates 610 toward the front of the machine 10. Arms 634 are rigidly connected to the side plates and terminate in free ends. The free ends of arms 634 are connected by a torsion tube assembly that includes a rod 636 that is secured at its ends to the arms 634. Rod 636 extend down the center of an elongated coil spring 638. A torque tube 640 receives the coil spring 638 and rod 636. One end of coil spring 638 is secured to rod 636 and the other end is anchored in the torque tube 640. This functions as a counterbalance to the torque tube 640 which is transferred to the dancer rollers 630 and 632. By changing coil spring 638 the tension exerted on the film can be changed to better accommodate a particular use of the machine. The torque tube 640 has a mounting tab 642 at each end to which are rigidly secured dancer arms 644 and 645. At the free ends of dancer arms 644 and 645 are secured U-shaped brackets 646 and 647 respectively. U-shaped bracket 646 has free ends 648 and 649 and U-shaped bracket 647 has free ends 650 and 651. Free ends 648 and 650 are connected by a rod 652 upon which is mounted the dancer roller tube 630. Free ends 649 and 651 are connected by a rod 654 upon which is mounted the dancer roller tube 632. The torque exerted by spring 638 provides a counterbalancing force to the dancer roller tubes 630 and 632 which effects the tension that these rolls apply to the film. The spring 638 can be replaced by one of different tension if it is desired to change the tension being applied to the film. However, the torque provided by spring 638 is not sufficient to hold the dancer arms 644 and 645 and the dancer rolls 630 and 632 up when the rolls are not in engagement with the film. Thus, the film holds the dancer up when the film is not threaded through the dancer rolls 630 and 632. When film is not threaded through the dancer mechanism, the dancer arms 644 and 645 along with the dancer rolls 630 and 632 hang vertical down like a pendulum. When the operation of the machine is stopped the weight of the dancer arms 644 and 645 along with the dancer rolls 630 and 632 cause them to move downwardly. Since the movement of the dancer is effected by its weight, which is constant, the location of the dancer does not effect the tension exerted on the film by the dancer. The main function of the dancer rolls is to speeds up or slows down the power unwind of the film from the film roll 625. When the dancer gets high the power unwind speeds up and when the dancer gets low the power unwind slows down. When the operation of the machine is stopped the dancer goes low because you are no longer using film. This slows down the power unwind as the dancer drops until it finally it is in its lowest most position. The tension on the film is not effected or changed as a result of the position of the dancer.

When operation of the machine is initiated, the dancer rolls are at their lowest position. An operator who is threading the film from the film roll 625 through the series of rollers, grasps a dancer arm 644 or 645 and raises the dancer rollers 630 and 632 up toward the position that they are in during operation. As a result of the film cage 600 being in its vertical position there is a straight path between the dancer rollers 630, 632 and the cooperating roller 605 and 606 through which the film can be conveniently threaded. After the film is threaded between the dancer rollers 630, 632 and the cooperating rollers 605 and 606 the operator can release the dancer arm 644 or 645 and the dancer rollers 630, 632 will gravitate downwardly. The power unwind of the large film roll 625 starts from zero and increases to its selected speed. The machine is consuming film during this start up when the film roll 625 is accelerating to its operating speed. During this start up period the dancers pivot up which release the film that was accumulated when they moved down to be available for consumption is first several cycles of the machine.

The dancer rollers work in cooperation with rollers 605 and 606 that are fixed relative to the side plates 610, and the film must be threaded between the dancer rollers and the cooperating fixed rollers. This greatly simplifies and speeds up the procedure for loading a new film roll 625 onto the machine and enables the complete operation to be done by one person without the need of special power equipment.

Figure 26:
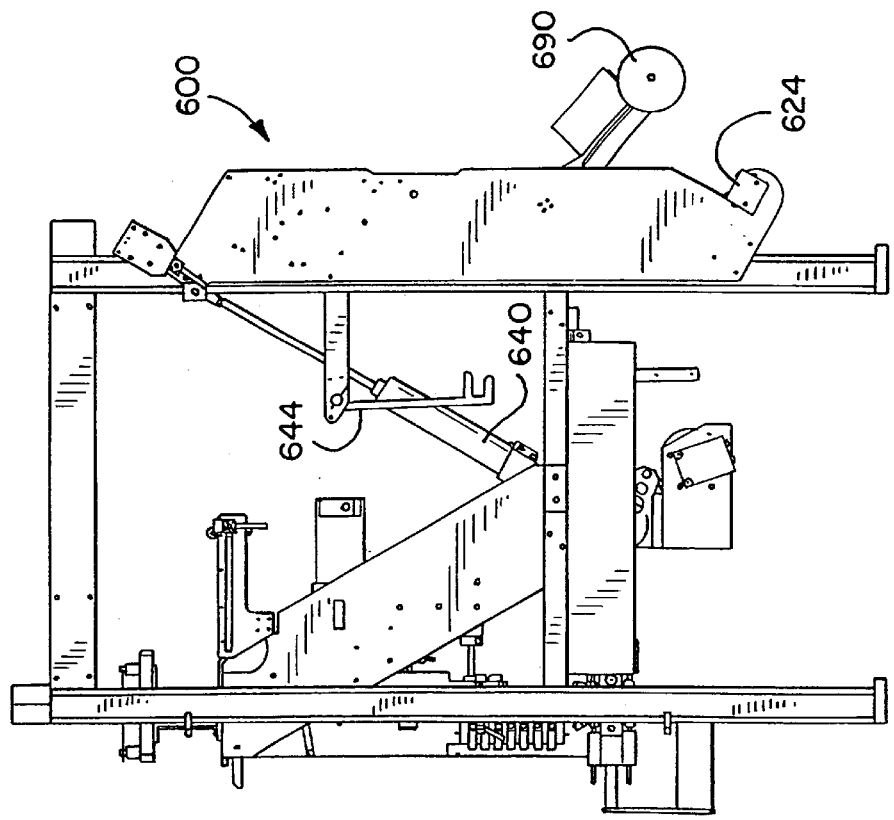
FIG. 26 is a schematic side view of the machine with the film cage in the vertical loading position and the film loaded, as shown by the broken line.

Reference is made to the series of FIGS. 25–28, which illustrate the film cage 600 in its operative position (FIGS. 27 and 28) and its vertical loading position (FIGS. 25 and 26). In FIG. 25, film is not loaded through the series of rolls carried by the film cage 600 and thus the dancer arms 644, 645 are hanging down in a vertical position. In the vertical loading position of the film cage seen in FIG. 25 the film roll mounts 624 for the film roll 625 are at there lowered position. At this lowered position a new roll can be rolled up to and easily placed on the film roll mounts 624. The loading of the film roll 625 can be accomplished by hand by a single operator and the need for power equipment such as an overhead crane is not required. Also, with the film cage in the position illustrated in FIG. 25, an operator standing directly behind the film cage 600 is within reach of the rollers 604, 605, 606 carried by the film cage over which the film is strung.

In FIG. 26, the series of rolls carried by the film cage 600 are represented by broken line circles and the film is represented by a broken line F. When the operator is threading the film from a new film roll 625 through the series or rolls a dancer arm 644 or 645 is grasped by the operator and pivoted up toward the operator to a horizontal position. In this horizontal position the dancer rollers 630 and 632 are aligned in a horizontal plane that is spaced above the horizontal plane of film cage rollers 605 and 606. There is a horizontal opening between the horizontal plane of the dancer rollers 630, 632 and the horizontal plane of firm cage rollers 605, 606 through which the film can be inserted in the film threading process. This simplifies the film threading process considerably since not only are the film cage rollers located at an easy reach to the operator the film can be properly threaded around rollers 630, 632, 605 and 606 by merely passing it through a horizontal opening between two sets of rollers.

Figure 27:
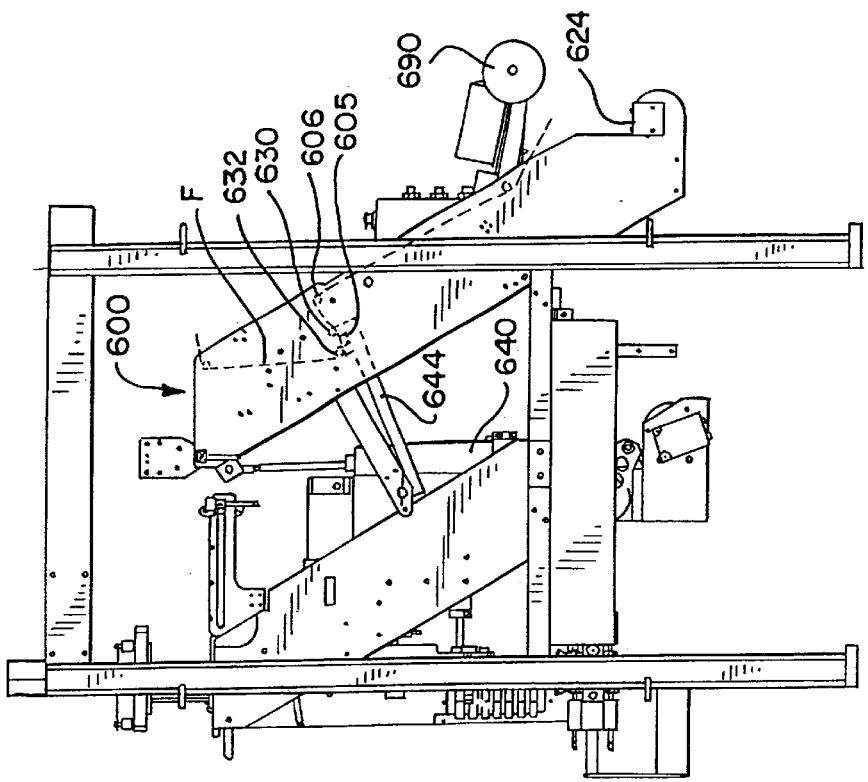
FIG. 27 is a schematic side view of the machine with the film cage in its inclined operative position and the dancer arms shown moved toward the vertical position.

In FIG. 27, the film cage 600 is shown pivoted to its inclined processing position and the operator has released the dancer arms 644 and 645 which have moved by gravity toward a vertical position. In this position of the film cage 600 and dancer arms 644 and 645 the film follows a festoon like pattern between the rollers 630, 632, 680 and 682. A considerable length of film is consumed by the flights extending between the rollers.

Figure 28:
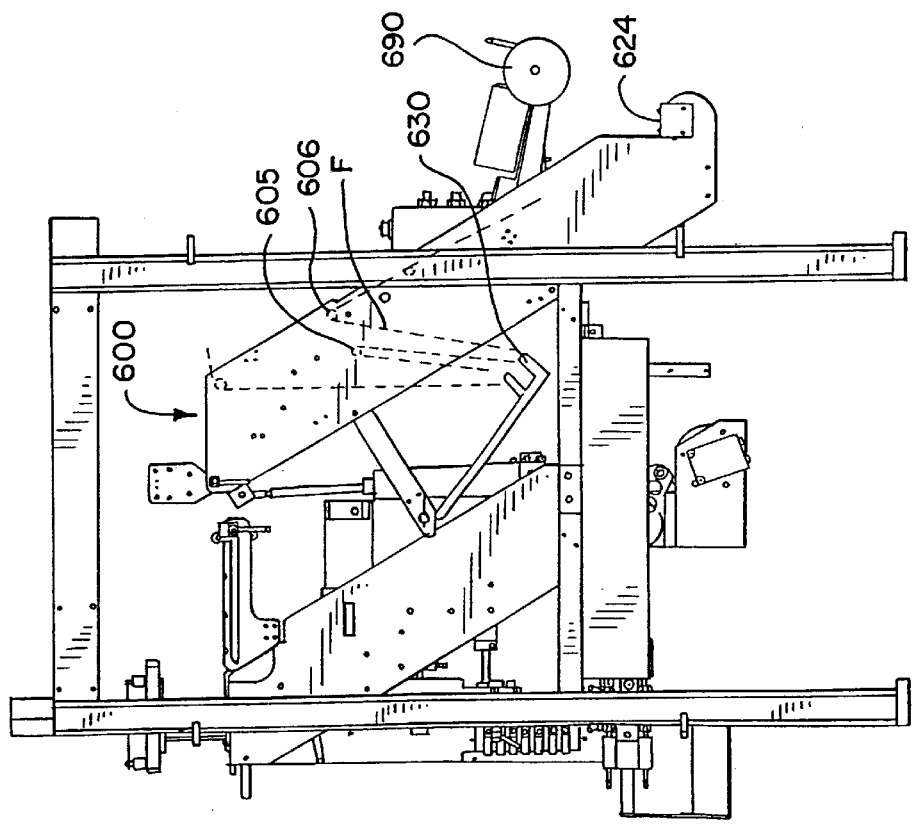
FIG. 28 is a schematic side view of the machine with the film cage in its inclined operative position and the dancer arms shown in their normal operative position.

When the operation of the machine is began the power feed 690 for the film roll 625 is turned on however the relatively large film roll 625 requires time to accelerate to its operating speed. During this start up period the bag forming components of the machine reach operating speed almost instantaneously. The lengths of film that were created as a result of the dancer arms 644 and 645 hanging down toward the vertical position is used during the start up period. When these lengths of material have been exhausted, the power feed 690 for the film roll 625 has reached its operating speed and sufficient film is being dispensed from the roll to accommodate the bag forming operation. The elimination of these stored film lengths causes the dancer arms 644 and 645 to pivot up such that the dancer rolls 630, 632 move to a position above the roller 605. This position of the dancer arms 644 and 645 and the dancer rolls 630 and 632 is illustrated in FIG. 28. FIG. 28 illustrates the position of the dancer arms 644, 645 during normal operation of the machine.

When the machine is turned off, the power to the power feed 690 for the film roll 625 is not turned off and continues to respond to the position of the dancer. However, now film is not being consumed at the other end of the film sheet and the dancer moves to its lower most position and functions to maintain tension on the film. The sensor on the dancer functions to reduce the voltage supplied to the power feed direct current motor as the dancer moves lower. Thus, the voltage supplied to the motor continues to decrease while maintaining tension on the film and eventually there is insufficient voltage to drive the motor. When the machine is started and consumption of the film is resumed, the dancer begins to move up, thus increasing the voltage to the motor, and feeding of the film is resumed.

While the invention has heretofore been described in detail with particular reference to illustrated apparatus, it is to be understood that variations, modifications and the use of equivalent mechanisms can be effected without departing from the scope of this invention. It is, therefore, intended that such changes and modifications be covered by the following claims.

What is claimed is:

1. The method of forming a lap seal in a heat sealable sheet of material comprising the steps of:
   a. overlapping marginal edges of said heat sealable sheet of material;
   b. providing a backup member behind the overlapped marginal edges of said heat sealable sheet of material;
   c. providing an internal hot air dispenser between said overlapped marginal edges;
   d. dispensing hot air from said internal hot air dispenser to the engaging surfaces of said overlapped marginal edges;
   e. providing an external hot air dispenser in front of the overlapped marginal edges of said heat sealable sheet of material; and
   f. dispensing hot air from said external hot air dispenser on said overlapped marginal edges in the direction toward said backup member.

2. The method of forming a lap seal in a heat sealable sheet of material as set forth in claim 1 comprising the additional steps of:
   g. maintaining said backup member, internal hot air dispenser and external hot air dispenser stationary; and
   h. conveying said overlapped marginal edges of said heat sealable sheet of material past the stationary backup member, internal hot air dispenser and external hot air dispenser.

3. The method of continuously forming packages having a longitudinal lap seal from heat sealable material comprising the steps of:

a. feeding a heat sealable web of material;
b. guiding said web of material such that marginal edges of said web of material become overlapped;
c. providing a backup member behind the overlapped marginal edges of said heat sealable sheet of material;
d. providing an internal hot air dispenser between said overlapped marginal edges;
e. dispensing hot air from said internal hot air dispenser to the engaging surfaces of said overlapped marginal edges;
f. providing an external hot air dispenser in front of the overlapped marginal edges of said heat sealable sheet of material;
g. dispensing hot air from said external hot air dispenser on said overlapped marginal edges toward said backup member to fuse the overlapped marginal edges and form said heat sealable web of material into a tube;
h. providing cross sealing jaws; and
i. forming cross seals in said tube while said tube is being fed.

4. The method of continuously forming packages, having a longitudinal lap seal, from heat sealable material as set forth in claim 3 comprising the additional steps of:

j. maintaining said backup member, internal hot air dispenser and external hot air dispenser stationary; and
k. conveying said overlapped marginal edges of said heat sealable sheet of material past the stationary backup member, internal hot air dispenser and external hot air dispenser;
l. moving said cross sealing jaws, during the cross sealing step, at the same rate that said heat sealable web of material is moving.

* * * * *